US012585477B2

(12) United States Patent
Agrawal et al.

(10) Patent No.: US 12,585,477 B2
(45) Date of Patent: Mar. 24, 2026

(54) AUTOMATED GENERATION AND EXECUTION OF APPLICATION PROGRAMMING INTERFACE CALLS

(71) Applicant: Dell Products L.P., Round Rock, TX (US)

(72) Inventors: Vikaskumar Ashok Agrawal, Round Rock, TX (US); Haseeb A. Zafar, Cedar Park, TX (US); Laijo Thomas, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 150 days.

(21) Appl. No.: 18/601,483

(22) Filed: Mar. 11, 2024

(65) Prior Publication Data

US 2025/0284503 A1 Sep. 11, 2025

(51) Int. Cl.
*G06F 9/445* (2018.01)
*G06F 9/50* (2006.01)
*G06F 11/3698* (2025.01)

(52) U.S. Cl.
CPC ........ *G06F 9/44505* (2013.01); *G06F 9/5077* (2013.01); *G06F 11/3698* (2025.01)

(58) Field of Classification Search
CPC . G06F 9/44505; G06F 11/3698; G06F 9/5077
USPC .......................................................... 713/1
See application file for complete search history.

(56) References Cited

U.S. PATENT DOCUMENTS

| | | | | |
|---|---|---|---|---|
| 5,708,974 A | * | 1/1998 | Smith ................. | H04W 72/044 |
| | | | | 455/62 |
| 6,112,024 A | * | 8/2000 | Almond .................... | G06F 8/71 |
| | | | | 707/999.203 |
| 2003/0107596 A1 | * | 6/2003 | Jameson ............ | G06Q 10/0631 |
| | | | | 715/762 |
| 2005/0166115 A1 | * | 7/2005 | Daume ............... | G06F 11/3447 |
| | | | | 714/E11.193 |

(Continued)

OTHER PUBLICATIONS

Talend, Inc., "Modern Data Management that Drives Real Value," https://www.talend.com/, Accessed Feb. 23, 2024, 9 pages.

(Continued)

*Primary Examiner* — Paul R. Myers
(74) *Attorney, Agent, or Firm* — Ryan, Mason & Lewis, LLP

(57) ABSTRACT

An apparatus comprises at least one processing device configured to receive a request to execute one or more orchestrations defining a sequence of actions utilizing one or more resource configurations associated with one or more data sources, the resource configurations comprising placeholders for parameters to be replaced at runtime during execution of the orchestrations. The at least one processing device is also configured to identify one or more request objects in the received request defining one or more parameter values to be used in place of the placeholders in the resource configurations. The at least one processing device is further configured to generate an application programming interface call configured to perform the sequence of actions defined in the orchestrations utilizing the parameter values defined in the request objects, and to execute the generated application programming interface call to generate one or more response objects.

20 Claims, 23 Drawing Sheets

200 ─ RECEIVE A REQUEST TO EXECUTE ONE OR MORE ORCHESTRATIONS, A GIVEN ONE OF THE ONE OR MORE ORCHESTRATIONS DEFINING A SEQUENCE OF TWO OR MORE ACTIONS, A GIVEN ONE OF THE TWO OR MORE ACTIONS UTILIZING ONE OR MORE RESOURCE CONFIGURATIONS ASSOCIATED WITH ONE OR MORE DATA SOURCES, THE ONE OR MORE RESOURCE CONFIGURATIONS COMPRISING ONE OR MORE PLACEHOLDERS FOR PARAMETERS TO BE REPLACED AT RUNTIME DURING EXECUTION OF THE GIVEN ACTION OF THE GIVEN ORCHESTRATION

202 ─ IDENTIFY ONE OR MORE REQUEST OBJECTS IN THE RECEIVED REQUEST, A GIVEN ONE OF THE ONE OR MORE REQUEST OBJECTS DEFINING ONE OR MORE PARAMETER VALUES TO BE USED IN PLACE OF THE ONE OR MORE PLACEHOLDERS IN THE ONE OR MORE RESOURCE CONFIGURATIONS ASSOCIATED WITH THE GIVEN ACTION OF THE GIVEN ORCHESTRATION

204 ─ GENERATE AN APPLICATION PROGRAMMING INTERFACE CALL CONFIGURED TO PERFORM THE GIVEN ACTION IN THE SEQUENCE OF TWO OR MORE ACTIONS DEFINED IN THE GIVEN ORCHESTRATION UTILIZING THE ONE OR MORE PARAMETER VALUES DEFINED IN THE GIVEN REQUEST OBJECT

206 ─ EXECUTE THE GENERATED APPLICATION PROGRAMMING INTERFACE CALL TO GENERATE ONE OR MORE RESPONSE OBJECTS

208 ─ PROVIDE, TO A CLIENT DEVICE ASSOCIATED WITH THE RECEIVED REQUEST, THE GENERATED ONE OR MORE RESPONSE OBJECTS

(56)                     References Cited

U.S. PATENT DOCUMENTS

| | | | |
|---|---|---|---|
| 2007/0234271 A1* | 10/2007 | Winkler | G06F 9/451 |
| | | | 717/100 |
| 2010/0056280 A1* | 3/2010 | Langan | A63F 13/30 |
| | | | 463/43 |
| 2010/0218084 A1* | 8/2010 | Sivadas | G06F 9/44505 |
| | | | 715/740 |
| 2011/0246550 A1* | 10/2011 | Levari | G06F 16/244 |
| | | | 709/201 |
| 2011/0258635 A1* | 10/2011 | Resende, Jr. | G06F 9/5038 |
| | | | 719/313 |
| 2015/0229645 A1* | 8/2015 | Keith | H04W 12/086 |
| | | | 726/4 |
| 2018/0048521 A1* | 2/2018 | Nair | H04L 41/22 |
| 2021/0158939 A1* | 5/2021 | Mathur | G16H 30/40 |
| 2023/0342357 A1* | 10/2023 | Mahanta | G06F 16/24532 |
| 2024/0235277 A1* | 7/2024 | Elshafie | H02J 50/80 |

OTHER PUBLICATIONS

Cdata Software, "Comprehensive B2B Integration Made Simple," https://arc.cdata.com/, Accessed Jan. 15, 2024, 10 pages.

The Apache Software Foundation, "Apache Camel," https://camel.apache.org/, Accessed Jan. 15, 2024, 6 pages.

Appsmith, Inc., "Open-Source Internal Tool Builder," https://www.appsmith.com/, Accessed Feb. 23, 2024, 9 pages.

Hitachi Vantara, "Download Pentaho - Turn Data into Actionable Insights," https://www.hitachivantara.com/en-us/products/pentaho-plus-platform/data-integration-analytics/download-pentaho.html, Accessed Feb. 23, 2024, 5 pages.

Hevo Data Inc., "The Zero-maintenance Data Pipeline Platform," https://hevodata.com/, Accessed Jan. 15, 2024, 6 pages.

Looker Studio, "Overview," https://lookerstudio.google.com/overview, Accessed Jan. 15, 2024, 2 pages.

R. T. Fielding, "What is REST?" https://restfulapi.net/, Accessed Feb. 23, 2024, 23 pages.

Odata, "OData—The Best Way to REST," https://www.odata.org/, Accessed Feb. 23, 2024, 3 pages.

Google, " Looker Studio," https://cloud.google.com/looker-studio, Accessed Feb. 23, 2024, 9 pages.

The Graphql Foundation, "A Query Language for your API," https://graphql.org/, Accessed Feb. 23, 2024, 7 pages.

Github, "WorkMaze/JUST.net," https://github.com/WorkMaze/JUST.net, Accessed Feb. 23, 2024, 32 pages.

* cited by examiner

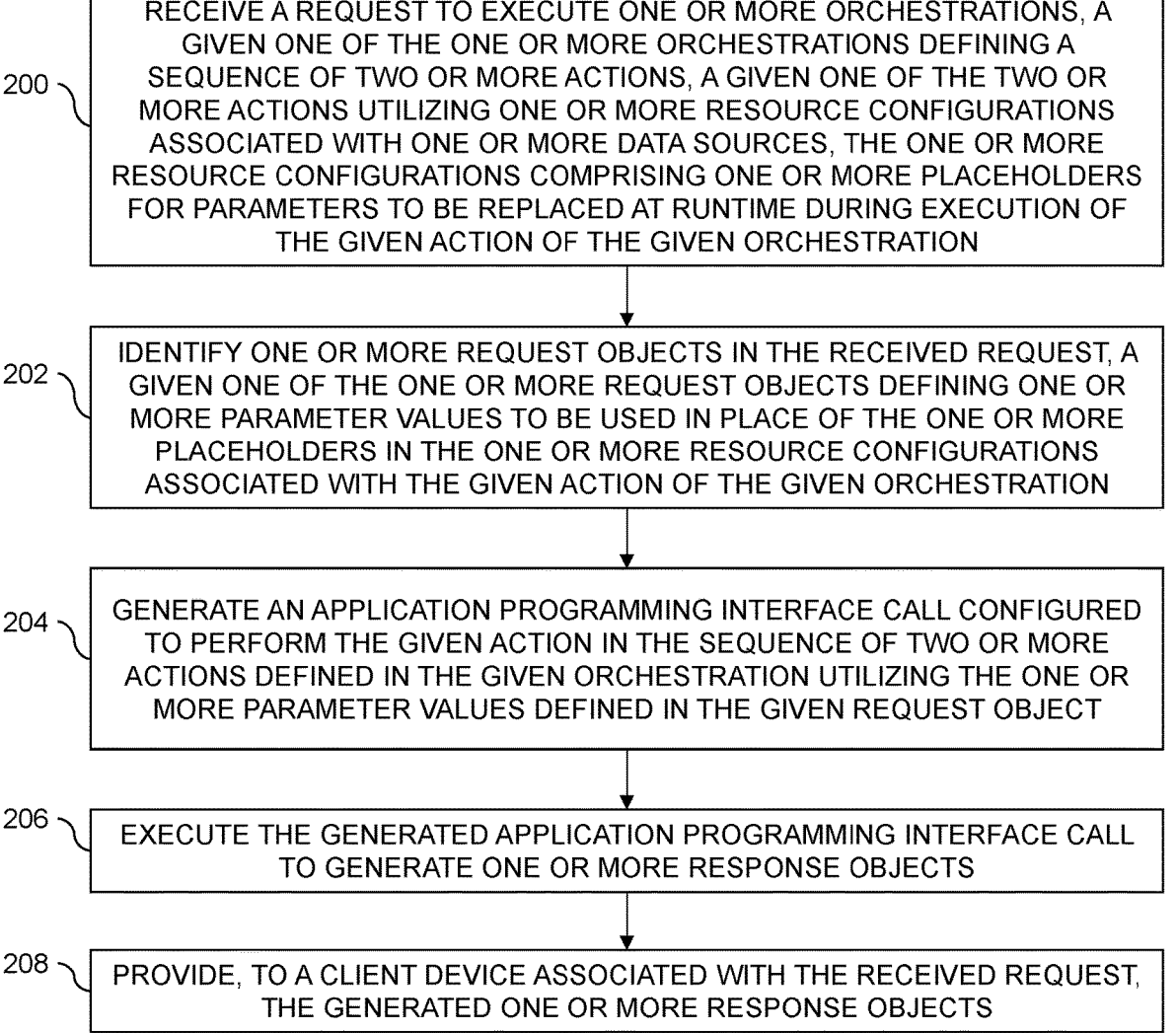

200 — RECEIVE A REQUEST TO EXECUTE ONE OR MORE ORCHESTRATIONS, A GIVEN ONE OF THE ONE OR MORE ORCHESTRATIONS DEFINING A SEQUENCE OF TWO OR MORE ACTIONS, A GIVEN ONE OF THE TWO OR MORE ACTIONS UTILIZING ONE OR MORE RESOURCE CONFIGURATIONS ASSOCIATED WITH ONE OR MORE DATA SOURCES, THE ONE OR MORE RESOURCE CONFIGURATIONS COMPRISING ONE OR MORE PLACEHOLDERS FOR PARAMETERS TO BE REPLACED AT RUNTIME DURING EXECUTION OF THE GIVEN ACTION OF THE GIVEN ORCHESTRATION

202 — IDENTIFY ONE OR MORE REQUEST OBJECTS IN THE RECEIVED REQUEST, A GIVEN ONE OF THE ONE OR MORE REQUEST OBJECTS DEFINING ONE OR MORE PARAMETER VALUES TO BE USED IN PLACE OF THE ONE OR MORE PLACEHOLDERS IN THE ONE OR MORE RESOURCE CONFIGURATIONS ASSOCIATED WITH THE GIVEN ACTION OF THE GIVEN ORCHESTRATION

204 — GENERATE AN APPLICATION PROGRAMMING INTERFACE CALL CONFIGURED TO PERFORM THE GIVEN ACTION IN THE SEQUENCE OF TWO OR MORE ACTIONS DEFINED IN THE GIVEN ORCHESTRATION UTILIZING THE ONE OR MORE PARAMETER VALUES DEFINED IN THE GIVEN REQUEST OBJECT

206 — EXECUTE THE GENERATED APPLICATION PROGRAMMING INTERFACE CALL TO GENERATE ONE OR MORE RESPONSE OBJECTS

208 — PROVIDE, TO A CLIENT DEVICE ASSOCIATED WITH THE RECEIVED REQUEST, THE GENERATED ONE OR MORE RESPONSE OBJECTS

```
{
  "Key": "GetSkuDetailsFromConfig_EMEA",
  "ResourceType": "SQLServer",
  "RequestBodyType": "TEXT(text/plain)",
  "ResponseBodyType": "JSON(application/json)",
  "Request": "SELECT DISTINCT TOP 100 FROM ITEM_CATALOG i WHERE i.SKU_NUM IN ('{0}') {1} {2} {3} {4} {5} {6}",
  "TimeOutInSecs": 60,
  "ConnectionDetails": [
    {
      "Environment": "SIT",
      "ConnectionString": "Data Source=<server name>;Initial Catalog=<db name>;Persist Security
                           Info=True;MultipleActiveResultSets=true"
    }
  ]
}
```

Figure 5:
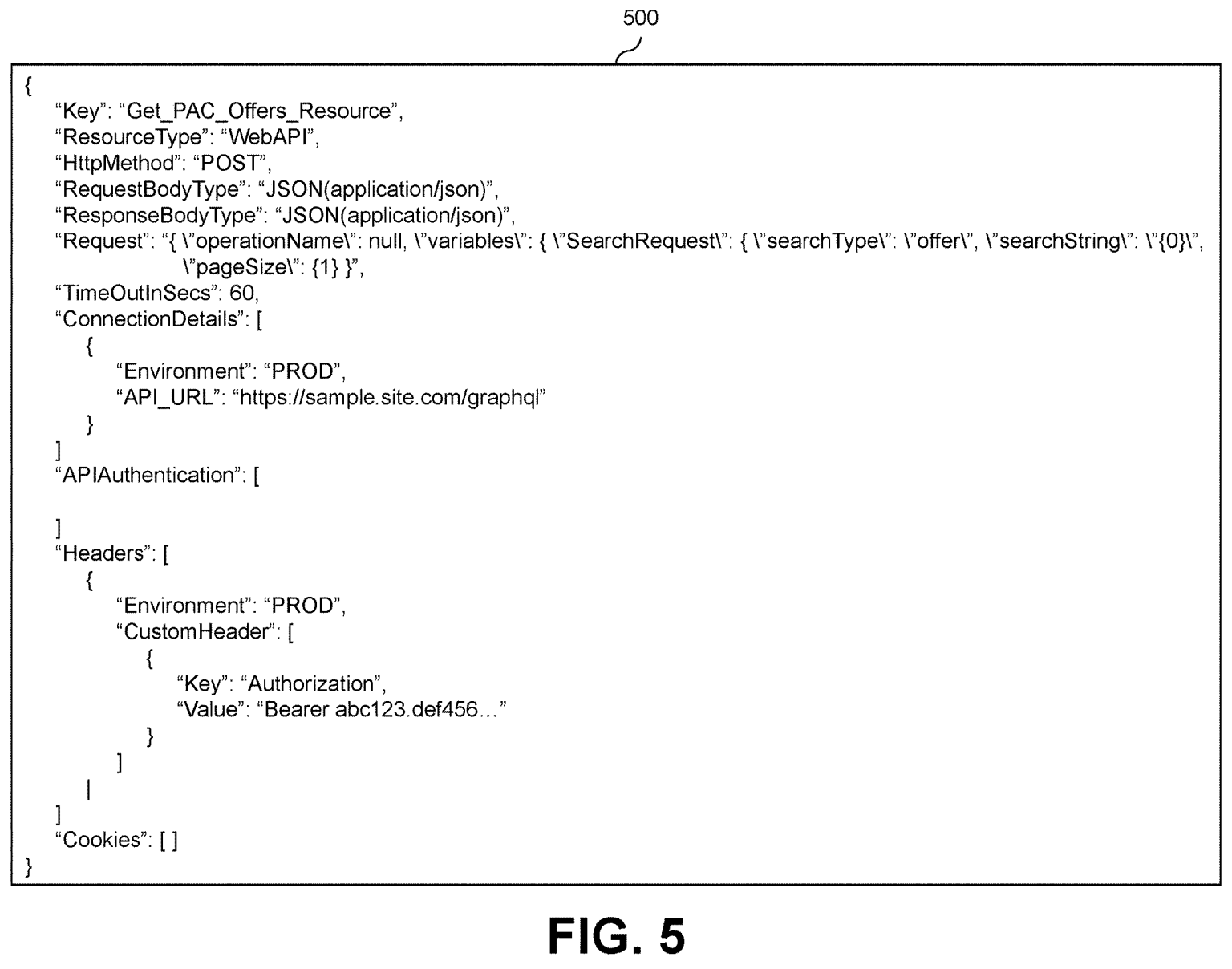

```
{
"Key": "Get_PAC_Offers_Resource",
"ResourceType": "WebAPI",
"HttpMethod": "POST",
"RequestBodyType": "JSON(application/json)",
"ResponseBodyType": "JSON(application/json)",
"Request": {"operationName": null, "variables": {"SearchRequest": {"searchType": "offer", "searchString": "{0}",
            "pageSize": {1} }",
"TimeOutInSecs": 60,
"ConnectionDetails": [
    {
    "Environment": "PROD",
    "API_URL": "https://sample.site.com/graphql"
    }
],
"APIAuthentication": [
    {
    "Environment": "PROD",
    "CustomHeader": [
        {
        "Key": "Authorization",
        "Value": "Bearer abc123.def456..."
        }
    ]
    }
],
"Cookies": [ ]
}
```

```
{
  "Key": "ConfigDataService",
  "ResourceType": "WCF",
  "HttpMethod": "POST",
  "RequestBodyType": "XML(application/xml)",
  "ResponseBodyType": "XML(application/xml)",
  "Request": "<soapenv:Envelope xmlns:soapenv=\"https.schemas.xmlsoap.org/soap/envelope/\"
              xmlns:v3=\"http://site.site.com/product/contract/configService/v3\",
  "ConnectionDetails": [
    {
      "Environment": "PROD",
      "API_URL": "http://sample1site.com/ConfigService/V3/ConfigDataService.svc"
    },
    {
      "Environment": "SIT-G4",
      "API_URL": "http://sample2site.com/ConfigService/V3/ConfigDataService.svc"
    }
  ],
  "APIAuthentication": [ ],
  "Header": [ ],
  "TimeOutInSecs": 60,
  "Cookies": [ ]
}
```

Figure 7:
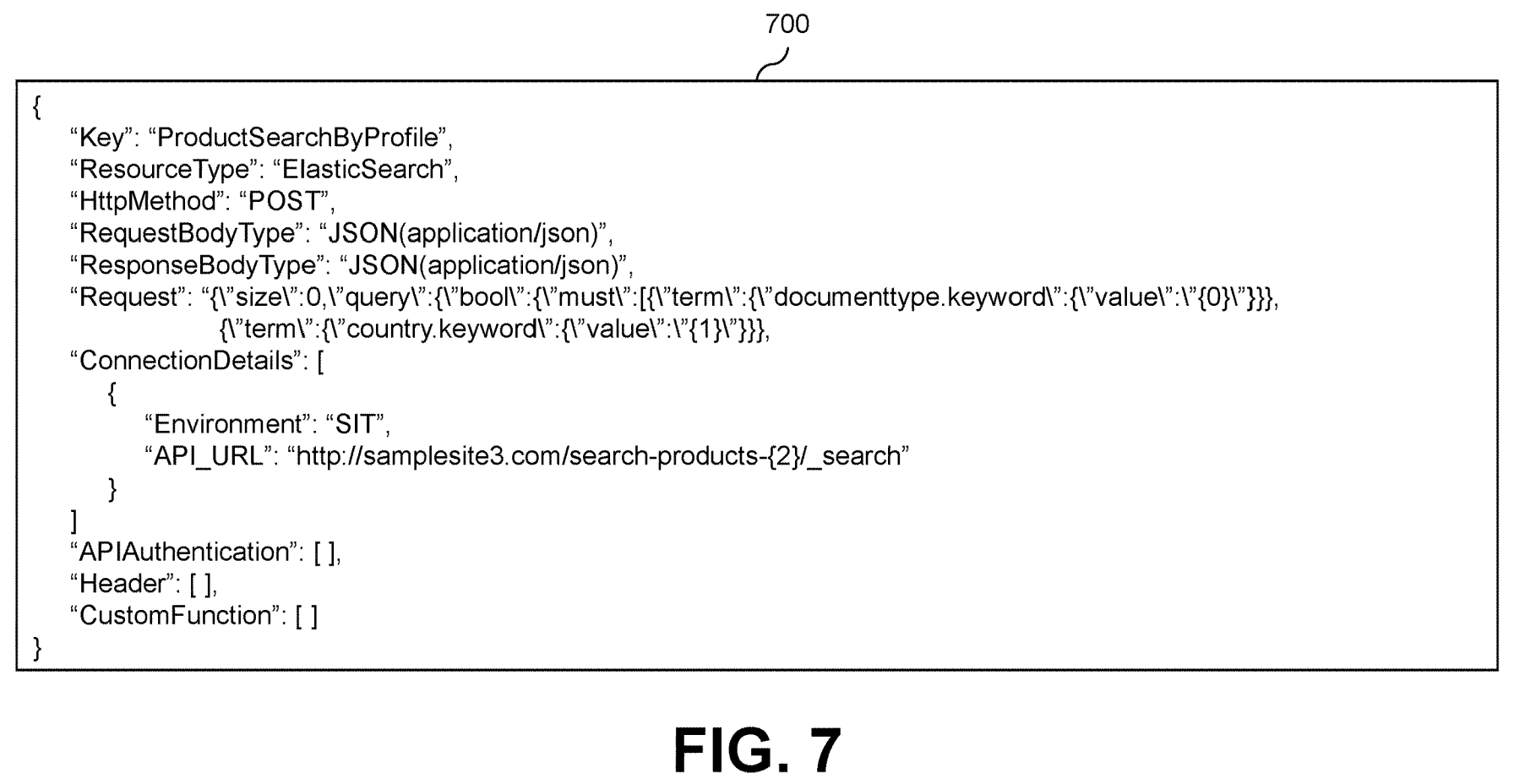

```
{
  "Key": "ProductSearchByProfile",
  "ResourceType": "ElasticSearch",
  "HttpMethod": "POST",
  "RequestBodyType": "JSON(application/json)",
  "ResponseBodyType": "JSON(application/json)",
  "Request": "{\"size\":0,\"query\":{\"bool\":{\"must\":[{\"term\":{\"documenttype.keyword\":{\"value\":\"{0}\"}}},
             {\"term\":{\"country.keyword\":{\"value\":\"{1}\"}}},
  "ConnectionDetails": [
    {
      "Environment": "SIT",
      "API_URL": "http://samplesite3.com/search-products-{2}/_search"
    }
  ],
  "APIAuthentication": [],
  "Header": [],
  "CustomFunction": []
}
```

| Name | Resource Type |
|---|---|
| Get_PAC_Offers_Resource | WebAPI |
| Get_PAC_OfferGroups_Resource | WebAPI |
| GetDataPipelineSelfServiceContent | WebAPI |
| GetKafkaLogDetailsProd | WebAPI |
| GetEventLog | ElasticSearch |
| GetEventLogs | ElasticSearch |
| GetAllCollectionItemKeyDataDraft | WebAPI |
| GetAllCollectionItemKeyDataProd | WebAPI |
| Searchdocuments | WebAPI |
| Getitems_fromindex | ElasticSearch |
| GetSkuDetailsFromConfig | SQLServer |
| GetSkuDetailsFromConfig_EMEA | SQLServer |
| Failedlog | FileSystem |
| Create_esitem | ElasticSearch |
| CS_CreateItem | WebAPI |

**Get_PAC_Offers_Resource
Summary**

ID (Required)

| |
|---|
| Get_PAC_Offers_Resource |

Name (Required)

| |
|---|
| Get_PAC_Offers_Resource |

Resource Type (Required)

| |
|---|
| WebAPI |

HTTP Method (Required)

| |
|---|
| POST |

Request Body Type (Required)

| |
|---|
| JSON(application/json) |

Response Body Type (Required)

| |
|---|
| JSON(application/json) |

Request Schema

| |
|---|
| { \"operationName\": null, \"variables\": { \"SearchRequest\": { \"searchType\": \"offer\", \"searchString\": \"{0}\", \"pageSize\": {1} } |

Internal Resource ID

| |
|---|
|  |

Response Schema

| |
|---|
|  |

Timeout in Seconds

| |
|---|
| 60 |

FIG. 9A 900-2

Figure 9B:
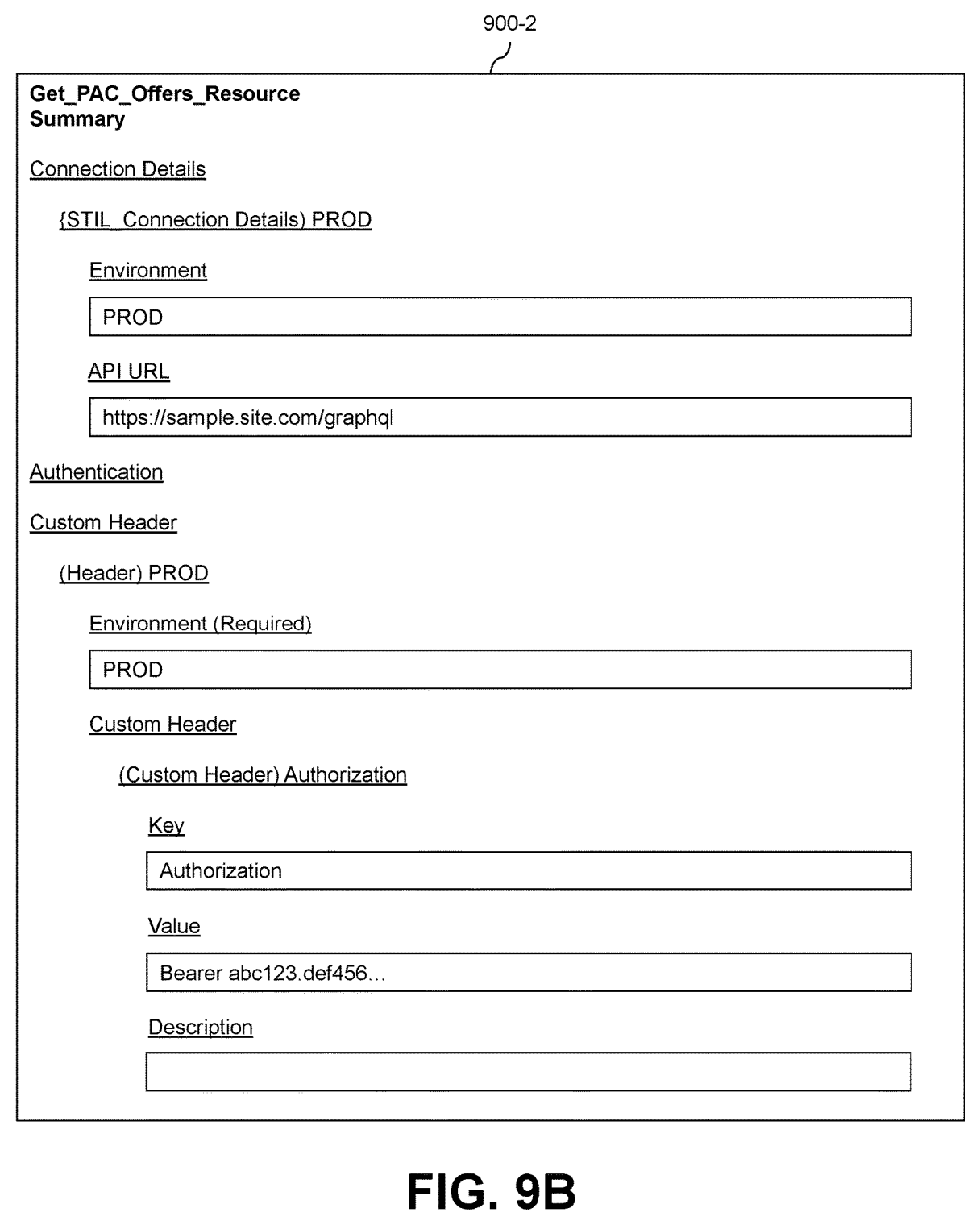

**Get_PAC_Offers_Resource
Summary**

Connection Details

{STIL_Connection Details) PROD

Environment

| PROD |

API URL

| https://sample.site.com/graphql |

Authentication

Custom Header (Header) PROD

Environment (Required)

| PROD |

Custom Header (Custom Header) Authorization

Key

| Authorization |

Value

| Bearer abc123.def456... |

Description

| |

Figure 10:
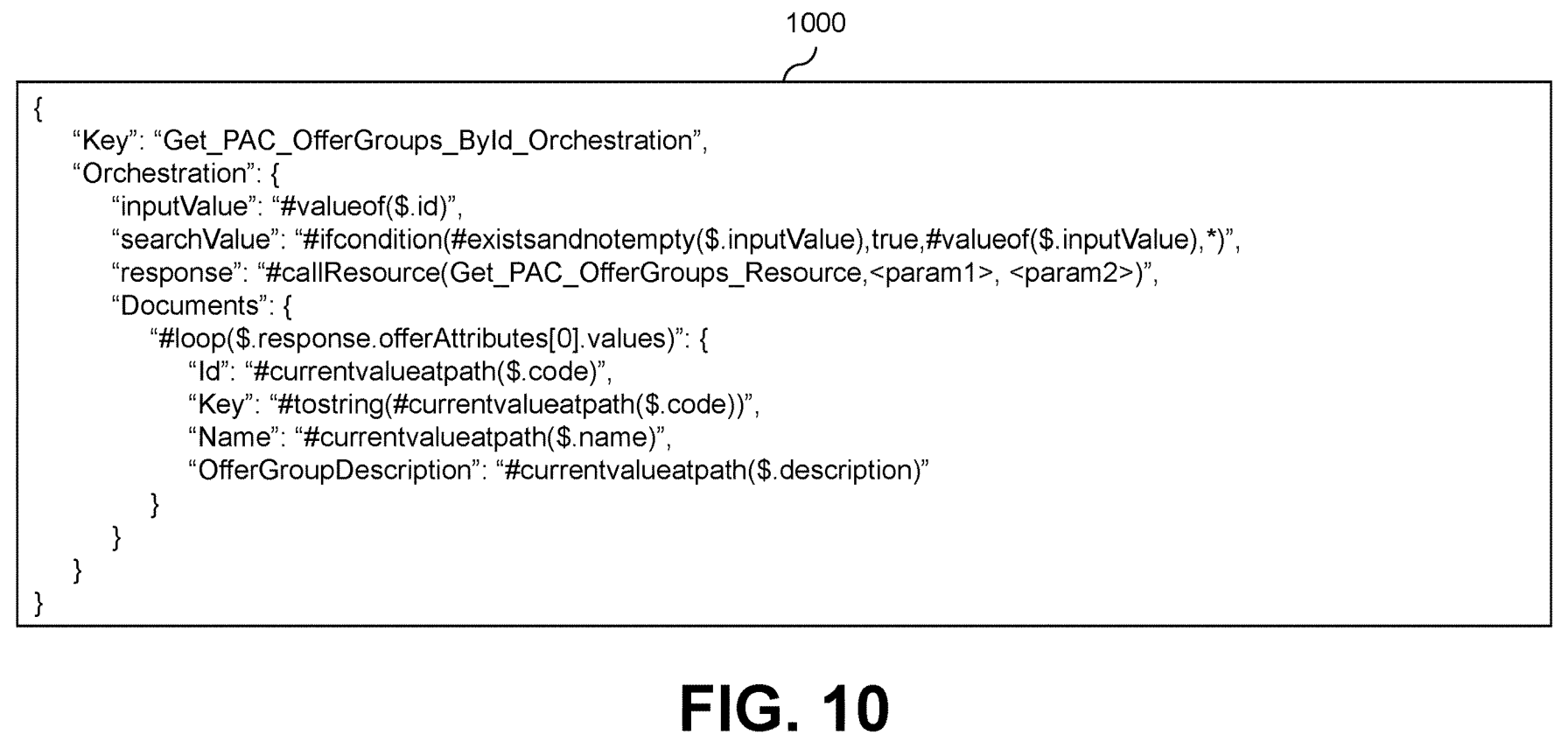

```
{
    "Key": "Get_PAC_OfferGroups_ById_Orchestration",
    "Orchestration": {
        "inputValue": "#valueof($.id)",
        "searchValue": "#ifcondition(#existsandnotempty($.inputValue),true,#valueof($.inputValue),*)",
        "response": "#callResource(Get_PAC_OfferGroups_Resource,<param1>, <param2>)",
        "Documents": {
            "#loop($.response.offerAttributes[0].values)": {
                "Id": "#currentvalueatpath($.code)",
                "Key": "#tostring(#currentvalueatpath($.code))",
                "Name": "#currentvalueatpath($.name)",
                "OfferGroupDescription": "#currentvalueatpath($.description)"
            }
        }
    }
}
```

Figure 11:
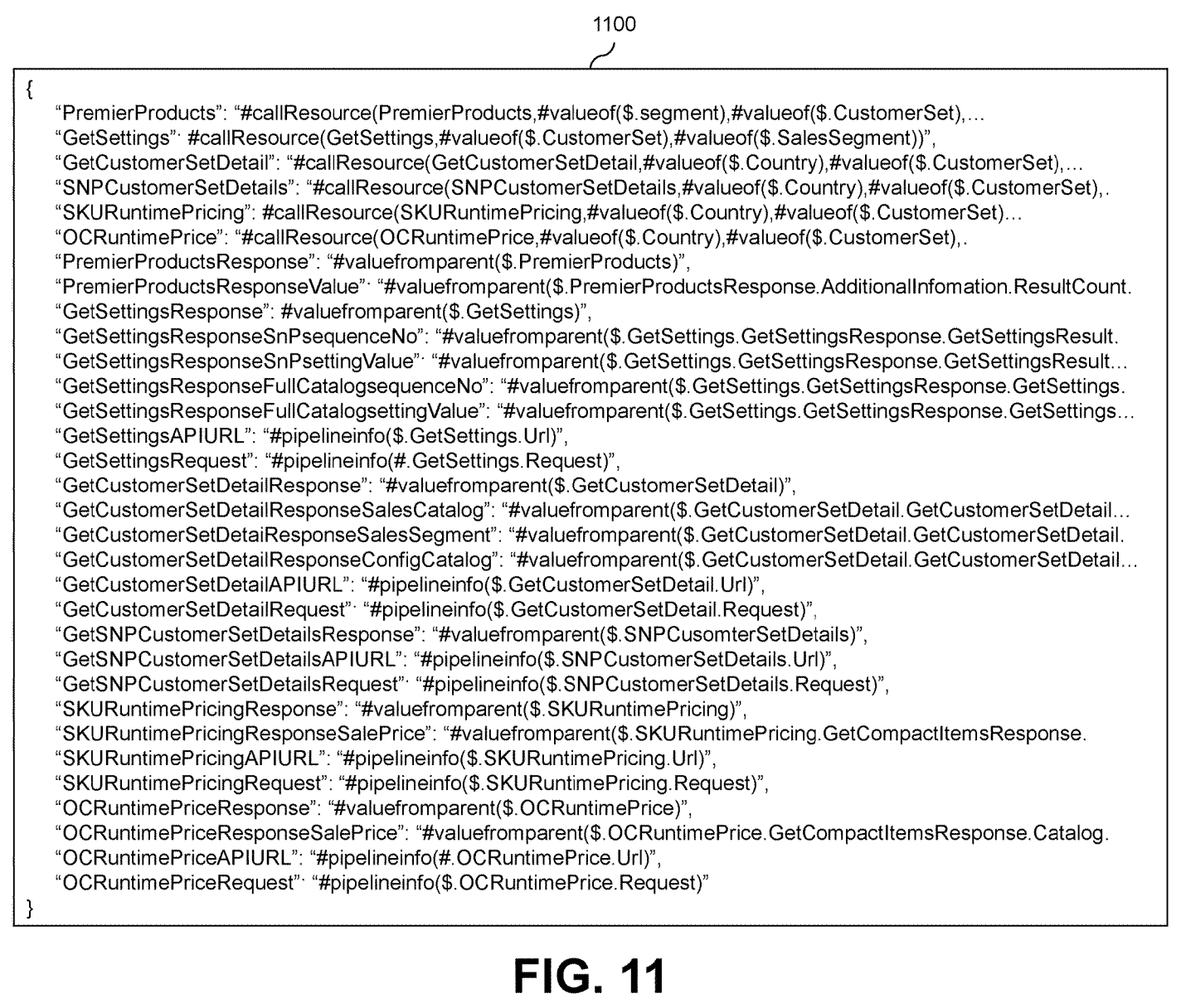

```
{
"PremierProducts": "#callResource(PremierProducts,#valueof($.segment),#valueof($.CustomerSet),...
"GetSettings": "#callResource(GetSettings,#valueof($.CustomerSet),#valueof($.SalesSegment))",
"GetCustomerSetDetail": "#callResource(GetCustomerSetDetail,#valueof($.Country),#valueof($.CustomerSet),....
"SNPCustomerSetDetails": "#callResource(SNPCustomerSetDetails,#valueof($.Country),#valueof($.CustomerSet),..
"SKURuntimePricing": "#callResource(SKURuntimePricing,#valueof($.Country),#valueof($.CustomerSet)...
"OCRuntimePrice": "#callResource(OCRuntimePrice,#valueof($.Country),#valueof($.CustomerSet),..
"PremierProductsResponse": "#valuefromparent($.PremierProducts)",
"PremierProductsResponseValue": "#valuefromparent($.PremierProductsResponse.AdditionalInfomation.ResultCount.
"GetSettingsResponse": #valuefromparent($.GetSettings)",
"GetSettingsResponseSnPsequenceNo": "#valuefromparent($.GetSettings.GetSettingsResponse.GetSettingsResult.
"GetSettingsResponseSnPsettingValue": "#valuefromparent($.GetSettings.GetSettingsResponse.GetSettingsResult...
"GetSettingsResponseFullCatalogsequenceNo": "#valuefromparent($.GetSettings.GetSettingsResponse.GetSettings.
"GetSettingsResponseFullCatalogsettingValue": "#valuefromparent($.GetSettings.GetSettingsResponse.GetSettings...
"GetSettingsAPIURL": "#pipelineinfo($.GetSettings.Url)",
"GetSettingsRequest": "#pipelineinfo(#.GetSettings.Request)",
"GetCustomerSetDetailResponse": "#valuefromparent($.GetCustomerSetDetail)",
"GetCustomerSetDetailResponseSalesCatalog": "#valuefromparent($.GetCustomerSetDetail.GetCustomerSetDetail...
"GetCustomerSetDetailResponseSalesSegment": "#valuefromparent($.GetCustomerSetDetail.GetCustomerSetDetail.
"GetCustomerSetDetailResponseConfigCatalog": "#valuefromparent($.GetCustomerSetDetail.GetCustomerSetDetail...
"GetCustomerSetDetailAPIURL": "#pipelineinfo($.GetCustomerSetDetail.Url)",
"GetCustomerSetDetailRequest": "#pipelineinfo($.GetCustomerSetDetail.Request)",
"GetSNPCustomerSetDetailsResponse": "#valuefromparent($.SNPCusomterSetDetails)",
"GetSNPCustomerSetDetailsAPIURL": "#pipelineinfo($.SNPCustomerSetDetails.Url)",
"GetSNPCustomerSetDetailsRequest": "#pipelineinfo($.SNPCustomerSetDetails.Request)",
"SKURuntimePricingResponse": "#valuefromparent($.SKURuntimePricing)",
"SKURuntimePricingResponseSalePrice": "#valuefromparent($.SKURuntimePricing.GetCompactItemsResponse.
"SKURuntimePricingAPIURL": "#pipelineinfo($.SKURuntimePricing.Url)",
"SKURuntimePricingRequest": "#pipelineinfo($.SKURuntimePricing.Request)",
"OCRuntimePriceResponse": "#valuefromparent($.OCRuntimePrice)",
"OCRuntimePriceResponseSalePrice": "#valuefromparent($.OCRuntimePrice.GetCompactItemsResponse.Catalog.
"OCRuntimePriceAPIURL": "#pipelineinfo(#.OCRuntimePrice.Url)",
"OCRuntimePriceRequest": "#pipelineinfo($.OCRuntimePrice.Request)"
}
```

| Name | Version | Created By | Created On | Modified By | Modified On | Publish Status | Schedule Start Date | Schedule End Date |
|---|---|---|---|---|---|---|---|---|
| Get_PAC_OfferGroups_ById_Orchestration | 0.1 | User_1 | Date_1 | User_1 | Date_1 | Draft | Immediate | Never |
| Get_PAC_OfferGroups_Orchestration | 0.1 | User_1 | Date_1 | User_1 | Date_1 | Draft | Immediate | Never |
| Get_PAC_OfferGroups_ById_Orchestration | 0.1 | User_1 | Date_1 | User_1 | Date_1 | Draft | Immediate | Never |
| Get_PAC_Offers_Orchestration | 0.1 | User_1 | Date_1 | User_1 | Date_1 | Draft | Immediate | Never |
| GetAllCollectionDataDraft | 0.2 | User_2 | Date_2 | User_2 | Date_14 | Draft | Immediate | Never |
| GetEventLogs | 0.3 | User_2 | Date_2 | User_2 | Date_2 | Draft | Immediate | Never |
| SearchDocuments | 0.1 | User_3 | Date_3 | User_3 | Date_3 | Draft | Immediate | Never |
| PremierFlow | 0.13 | User_4 | Date_4 | User_4 | Date_15 | Draft | Immediate | Never |
| PricingInfoByQuote_v3 | 0.6 | User_5 | Date_5 | User_5 | Date_16 | Draft | Immediate | Never |
| GetSkuDetailsFromConfigDB | 0.20 | User_5 | Date_6 | User_5 | Date_16 | Draft | Immediate | Never |
| CollabEventLog_GetItems | 0.2 | User_6 | Date_7 | User_5 | Date_16 | Draft | Immediate | Never |
| CollabEventLog_GetItem | 0.2 | User_6 | Date_7 | User_5 | Date_16 | Draft | Immediate | Never |
| PricingInfo_v2 | 0.19 | User_5 | Date_8 | User_5 | Date_16 | Draft | Immediate | Never |
| PricingInfo_v2Array | 0.21 | User_5 | Date_8 | User_5 | Date_16 | Draft | Immediate | Never |
| PricingInfoByQuote_v2 | 0.19 | User_6 | Date_9 | User_5 | Date_16 | Draft | Immediate | Never |
| GetEvaluatedRefiners | 0.9 | User_6 | Date_10 | User_5 | Date_16 | Draft | Immediate | Never |
| GetEvaluatedRefiners_v2 | 0.3 | User_6 | Date_11 | User_5 | Date_16 | Draft | Immediate | Never |
| GetProductsByCategory | 0.2 | User_6 | Date_11 | User_5 | Date_16 | Draft | Immediate | Never |
| GetRefinerContecnt | 0.2 | User_4 | Date_12 | User_5 | Date_16 | Draft | Immediate | Never |
| ProductSearchByProfile_v78 | 0.7 | User_5 | Date_13 | User_5 | Date_16 | Draft | Immediate | Never |
| ProductByCategory_v78 | 0.4 | User_5 | Date_13 | User_5 | Date_16 | Darft | Immediate | Never |

Orchestration Create/Edit Form
*Get_PAC_OfferGroups_ById_Orchestration*

Summary

ID (Required)

| Get_PAC_OfferGroups_ById_Orchestration |
|---|

Name (Required)

| Get_PAC_OfferGroups_ById_Orchestration |
|---|

Source

|  |
|---|

Destination JSON

|  |
|---|

Resource

| Get_PAC_OfferGroups_Resource |
|---|

STIL Transformation

| {"inputValue": "valueof($.id)", "searchValue": "#ifcondition(#existsandnotempty($.InputValue), true, #valueof($.InputValue),*)", "response": #skipcustomfunction(STIL.Utility.GetServiceResp... |
|---|

```
JSON Editor to Manage Transformation on Click of </>:
JSON Editor

{
  "inputValue": "#valueof($.id)",
  "searchValue": "#ifcondition(#existsandnotempty($.inputValue),true,#valueof($.inputValue),*)",
  "response": "#skipcustomfunction(STIL.Utility.GetServiceResponse,Get_PAC_OfferGroups_Resource,)",
  "Documents": {
      "#loop($.response.data.referenceData[0].offerAttributes[0].values)": {
          "Id": "#currentvalueatpath($.code)",
          "Key": "#tostring(#currentvalueatpath($.code))",
          "Name": "#currentvalueatpath($.name)",
          "OfferGroupDescription": "#currentvalueatpath($.description)"
      }
  },
  "#skipnode": "#valueof($.Documents[0])",
  "#": [
      "#delete($.inputValue)",
      "#delete($.searchValue)",
      "#delete($.Documents)"
  ]
}
```

API call to Orchestration which does not need any request parameters

POST "https://<host name>/api/GetAllCategories/SIT?forceCacheRefresh=true&includepipeline=true"

1505

API call to Orchestration which accepts parameters as query strings

POST "https://<host name>/api/GetCategoryById/SIT?forceCacheRefresh=true&includepipeline=true&id=4099"

1510

API call to Orchestration which accepts parameters as request body

POST "https://<host name>/api/GenerateCategoryTree/SIT?forceCacheRefresh=true&includepipeline=true"

```
{
  "ProductType": "winsnp",
  "Country": "us",
  "Segment": "dhs",
  "Language": "en"
}
```

```
{
    "type": "Category_Accessories",
    "data: [
        {
            "ParentId": "abcd-efgh-1234"
            "Id": "jklm-nopq-5678"
            "NodePath": "1234/5678/9012/3456",
            "Key": "1234",
            "Name": "Category 5/5e Patch Cables"
        },
        {
            "ParentId": "bcde-fghi-2345"
            "Id": "klmn-opqr-6789"
            "NodePath": "2345/6789/0123/4567",
            "Key": "2345",
            "Name": "Laptop Bags & Cases"
        },
        {
            "ParentId": "cdef-ghij-3456"
            "Id": "lmno-pqrs-7890"
            "NodePath": "3456/7890/1234/5678",
            "Key": "3456",
            "Name": "Instant Cameras"
        }
    ]
}
```

```
{
    {
        "ModelAssociation_Country": [
            "us"
        ],
        "ModelAssociation": [
            {
                "Id": "OnlineMerchandizingModel_Audio",
                "Name": "OnlineMerchandizingModel_Audio",
                "CollectionId": "1234abcd-5678-efgh"
                "ElasticPath": "DynamicProperties.ModelAssociation.[0]"
            }
        ],
        "ModelAssociation_Segment": [
            "BSD"
        ],
        "Persona": [ ],
        "ModelAssociation_Category": [
            {
                "CollectionId": "2345-bcde-6789-fghi"
                "Id": "laptops",
                "Name": "Laptops & 2-in-1s",
                "ElasticPath": "DynamicProperties.ModelAssociation_Category.[0]"
            },
            {

"CollectionId": "3456-cdef-7890-ghij"
                "Id": "laptops-modelA",
                "Name": "ModelA Laptops",
                "ElasticPath": "DynamicProperties.ModelAssociation_Category.[1]"
            },
            {
                "CollectionId": "4567-defg-8901-hijk"
                "Id": "laptops-modelB",
                "Name": "ModelB Laptops",
                "ElasticPath": "DynamicProperties.ModelAssociation_Category.[2]"
            }
        ]
    }
}
```

FIG. 17

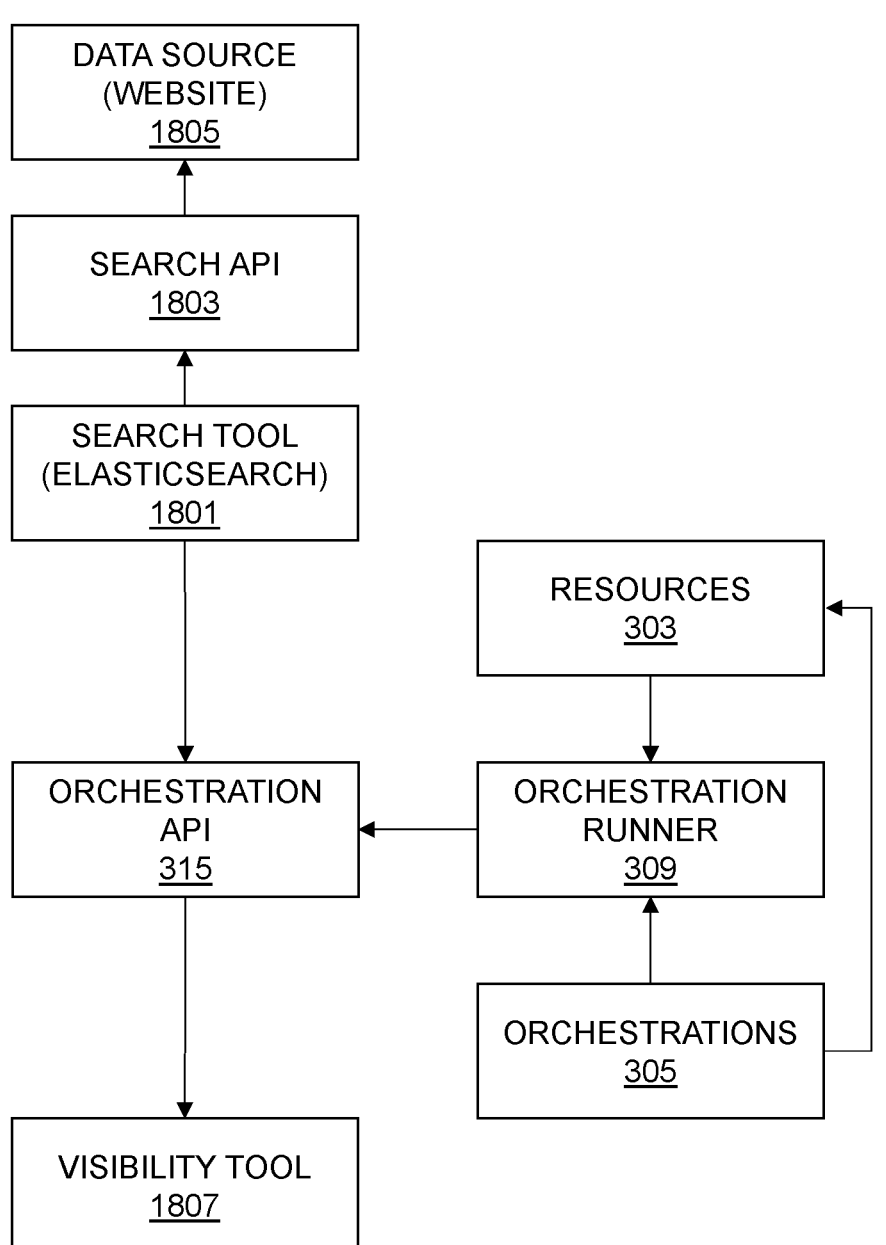
1800
FIG. 18

AUTOMATED GENERATION AND EXECUTION OF APPLICATION PROGRAMMING INTERFACE CALLS

COPYRIGHT NOTICE

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for automated generation and execution of application programming interface calls.

In one embodiment, an apparatus comprises at least one processing device comprising a processor coupled to a memory. The at least one processing device is configured to receive a request to execute one or more orchestrations, a given one of the one or more orchestrations defining a sequence of two or more actions, a given one of the two or more actions utilizing one or more resource configurations associated with one or more data sources, the one or more resource configurations comprising one or more placeholders for parameters to be replaced at runtime during execution of the given action of the given orchestration. The at least one processing device is also configured to identify one or more request objects in the received request, a given one of the one or more request objects defining one or more parameter values to be used in place of the one or more placeholders in the one or more resource configurations associated with the given action of the given orchestration. The at least one processing device is further configured to generate an application programming interface call configured to perform the given action in the sequence of two or more actions defined in the given orchestration utilizing the one or more parameter values defined in the given request object, and to execute the generated application programming interface call to generate one or more response objects.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for automated generation and execution of application programming interface calls in an illustrative embodiment.

FIG. 4 shows pseudocode of a resource configuration for a relational database in an illustrative embodiment.

FIG. 5 shows pseudocode of a resource configuration for a web application programming interface in an illustrative embodiment.

FIG. 6 shows pseudocode of a resource configuration for a service in an illustrative embodiment.

FIG. 7 shows pseudocode of a resource configuration for a search data source in an illustrative embodiment.

FIG. 8 shows a table of resource configurations which may be managed utilizing a configuration user interface of an application programming interface as a service tool in an illustrative embodiment.

FIGS. 9A and 9B show portions of a configuration user interface of an application programming interface as a service tool configured for creating and editing resource configurations in an illustrative embodiment.

FIG. 10 shows pseudocode of an orchestration configuration for a web application programming interface call which transforms the call response to a different schema and format in an illustrative embodiment.

FIG. 11 shows pseudocode of an orchestration configuration for calling multiple resources and stitching responses from the multiple resources together to build an aggregated response in an illustrative embodiment.

FIG. 12 shows a table of orchestration configurations which may be managed utilizing a configuration user interface of an application programming interface as a service tool in an illustrative embodiment.

FIG. 13 shows a portion of a configuration user interface of an application programming interface as a service tool configured for creating and editing orchestration configurations in an illustrative embodiment.

FIG. 14 shows a portion of a configuration user interface of an application programming interface as a service tool configured for managing orchestrations in an illustrative embodiment.

FIG. 15 shows pseudocode for calling an orchestration application programming interface of an application programming interface as a service tool in an illustrative embodiment.

FIG. 16 shows pseudocode for results of calling an orchestration utilizing an orchestration application programming interface of an application programming interface as a service tool in an illustrative embodiment.

FIG. 17 shows pseudocode for results of calling another orchestration utilizing an orchestration application programming interface of an application programming interface as a service tool in an illustrative embodiment.

FIG. 18 shows a system implementing an orchestration for search using an application programming interface as a service tool in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
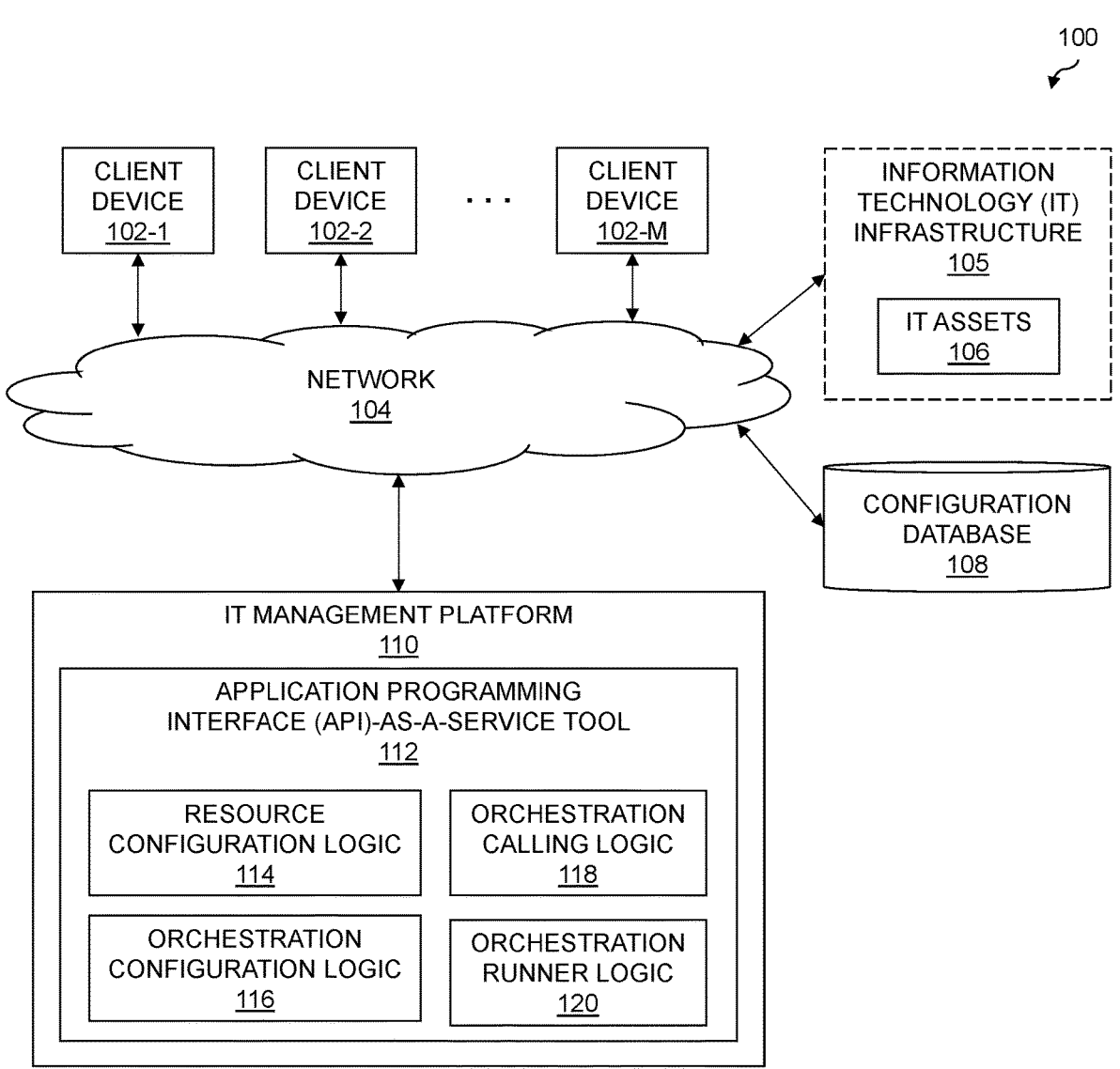
FIG. 1 is a block diagram of an information processing system configured for automated generation and execution of application programming interface calls in an illustrative embodiment.

FIG. 1 shows an information processing system 100 configured in accordance with an illustrative embodiment. The information processing system 100 is assumed to be built on at least one processing platform and provides functionality for automated generation and execution of application programming interface (API) calls. The information processing system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a configuration database 108, and an IT management platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the IT management platform 110 is used for an enterprise system. For example, an enterprise may subscribe to or otherwise utilize the IT management platform 110 for managing IT assets 106 of the IT infrastructure 105 operated by that enterprise. Users of the enterprise associated with different ones of the client devices 102 may utilize the IT management platform 110 in order to orchestrate actions to be performed on or utilizing the IT assets 106 of the IT infrastructure 105, where such orchestration may include automated generation of one or more application programming interfaces (APIs) without requiring any manual coding of such APIs. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The configuration database 108 is configured to store and record various information that is utilized by the IT management platform 110. Such information may include, for example, resource configurations for resources (e.g., data sources) which may be utilized for implementing APIs, as well as orchestration configurations for sequences of one or more actions to be taken utilizing the configured resources in order to implement APIs. The configuration database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the IT management platform 110, as well as to support communication between the IT management platform 110 and other related systems and devices not explicitly shown.

The IT management platform 110 may be provided as a cloud service that is accessible by one or more of the client devices 102 to allow users thereof to manage actions or operations involving the IT assets 106 of the IT infrastructure 105 and/or other IT assets or resources. The client devices 102 may be configured to access or otherwise utilize the IT management platform 110 to automatically generate and run APIs on-the-fly without requiring any manual coding of the APIs. In some embodiments, the client devices 102 are assumed to be associated with system administrators, IT managers, support engineers or other authorized personnel responsible for managing or performing servicing of the IT assets 106. In some embodiments, the IT assets 106 of the IT infrastructure 105 are owned or operated by the same enterprise that operates the IT management platform 110. In other embodiments, the IT assets 106 of the IT infrastructure 105 may be owned or operated by one or more enterprises different than the enterprise which operates the IT management platform 110 (e.g., a first enterprise provides IT management functionality for multiple different customers, businesses, etc.). Various other examples are possible.

In some embodiments, the client devices 102 and/or the IT assets 106 of the IT infrastructure 105 may implement host agents that are configured for automated transmission of information with the IT management platform 110. It should be noted that a "host agent" as this term is generally used herein may comprise an automated entity, such as a software entity running on a processing device. Accordingly, a host agent need not be a human entity.

The IT management platform 110 in the FIG. 1 embodiment is assumed to be implemented using at least one processing device. Each such processing device generally comprises at least one processor and an associated memory, and comprises one or more functional modules or logic for controlling certain features of the IT management platform 110. In the FIG. 1 embodiment, the IT management platform 110 implements an API-as-a-Service (APIaaS) tool 112. The APIaaS tool 112 comprises resource configuration logic 114, orchestration configuration logic 116, orchestration calling logic 118, and orchestration runner logic 120. The resource configuration logic 114 is configured to generate one or more resource configurations associated with one or more data sources, where the resource configurations define how to access (e.g., connect and call/query) the data sources. The resource configurations may also define placeholders to be replaced with parameter values at runtime for accessing the data sources. The orchestration configuration logic 116 is configured to generate one or more orchestration configurations, where the orchestration configurations define sequences of actions, where the actions utilize the resource configurations associated with the data sources. The orchestration calling logic 118 is configured to receive requests to execute orchestrations (e.g., from the client devices 102), where the requests specify particular ones of the orchestration configurations and include request objects defining the parameter values to be used in place of the placeholders in the resource configurations utilized by the specified orchestration configurations. The orchestration runner logic 120 is configured to generate API calls configured to perform the actions defined in the specified orchestration configurations using the parameter values defined in the request objects, and to execute the generated API calls to generate one or more response objects which may be returned to the sources of the received request (e.g., the client devices 102).

At least portions of the APIaaS tool 112, the resource configuration logic 114, the orchestration configuration logic 116, the orchestration calling logic 118, and the orchestration runner logic 120 may be implemented at least in part in the form of software that is stored in memory and executed by a processor.

It is to be appreciated that the particular arrangement of the client devices 102, the IT infrastructure 105, the configuration database 108 and the IT management platform 110 illustrated in the FIG. 1 embodiment is presented by way of example only, and alternative arrangements can be used in other embodiments. As discussed above, for example, the IT management platform 110 (or portions of components thereof, such as one or more of the APIaaS tool 112, the resource configuration logic 114, the orchestration configuration logic 116, the orchestration calling logic 118, and the orchestration runner logic 120) may in some embodiments be implemented internal to one or more of the client devices 102 and/or the IT infrastructure 105.

The IT management platform 110 and other portions of the information processing system 100, as will be described in further detail below, may be part of cloud infrastructure.

The IT management platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the configuration database 108 and the IT management platform 110 or components thereof (e.g., the APIaaS tool 112, the resource configuration logic 114, the orchestration configuration logic 116, the orchestration calling logic 118, and the orchestration runner logic 120) may be implemented on respective distinct processing platforms, although numerous other arrangements are possible. For example, in some embodiments at least portions of the IT management platform 110 and one or more of the client devices 102, the IT infrastructure 105, the IT assets 106 and/or the configuration database 108 are implemented on the same processing platform. A given client device (e.g., 102-1) can therefore be implemented at least in part within at least one processing platform that implements at least a portion of the IT management platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the configuration database 108 and the IT management platform 110, or portions or components thereof, to reside in different data centers. Numerous other distributed implementations are possible. The IT management platform 110 can also be implemented in a distributed manner across multiple data centers.

Additional examples of processing platforms utilized to implement the IT management platform 110 and other components of the information processing system 100 in illustrative embodiments will be described in more detail below in conjunction with FIGS. 21 and 22.

It is to be understood that the particular set of elements shown in FIG. 1 for automated generation and execution of API calls is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for automated generation and execution of API calls will now be described in more detail with reference to the flow diagram of FIG. 2. It is to be understood that this particular process is only an example, and that additional or alternative processes automated generation and execution of API calls may be used in other embodiments.

In this embodiment, the process includes steps 200 through 208. These steps are assumed to be performed by the IT management platform 110 utilizing the APIaaS tool 112, the resource configuration logic 114, the orchestration configuration logic 116, the orchestration calling logic 118, and the orchestration runner logic 120. The process begins with step 200, receiving a request to execute one or more orchestrations. A given one of the one or more orchestrations defines a sequence of two or more actions, a given one of the two or more actions utilizing one or more resource configurations associated with one or more data sources, the one or more resource configurations comprising one or more placeholders for parameters to be replaced at runtime during execution of the given action of the given orchestration.

In some embodiments, the sequence of two or more actions defined in the given orchestration comprises (i) obtaining a response object in a first format from a given one of the one or more data sources and (ii) transforming the response object from the first format to a second format. The given data source may be associated with a first entity, the second format may be associated with a second entity, and the sequence of two or more actions defined in the given orchestration may further comprise at least one of: providing the transformed response object to another one of the one or more data sources associated with a second entity different than the first entity; and utilizing at least a portion the transformed response object as a request object provided to another one of the one or more data sources associated with a second entity different than the first entity.

In other embodiments, the sequence of two or more actions defined in the given orchestration may also or alternatively comprise (i) obtaining a first response object from a first one of the one or more data sources, (ii) obtaining a second response object from a second one of the one or more data sources, and (iii) generating an aggregated response object based at least in part on the first response object and the second response object. The first response object may be in a first format and the second response object may be in a second format, the second format being different than the first format. The first data source may be associated with a first entity and the second data source may be associated with a second entity, the second entity being different than the first entity.

In some embodiments, at least a given one of the one or more resource configurations associated with a given one of the one or more data sources comprises at least one of connection information specifying how to connect to the given data source and authentication information for accessing the given data source. At least one of the one or more data sources may comprise one of an API (e.g., a web API, a representational state transfer (REST) API, etc.) and a database (e.g., a relational database, a non-relational database, etc.).

The FIG. 2 process continues with step 202, identifying one or more request objects in the received request. A given one of the one or more request objects defining one or more parameter values to be used in place of the one or more placeholders in the one or more resource configurations associated with the given action of the given orchestration. In step 204, an API call configured to perform the given action in the sequence of two or more actions defined in the given orchestration utilizing the one or more parameter values defined in the given request object is generated. In step 206, the generated API call is executed to generate one or more response objects. In step 208, the generated one or more response objects are provided to a client device associated with the received request.

In some embodiments, the given request object specifies that error tracking is to be utilized during execution of the given orchestration, and at least one of the generated one or more response objects comprises error tracking information associated with the execution of the generated API call. The given request object may also or alternatively specify a given environment to be utilized during execution of the given orchestration, and the generated API call is executed in the given environment. The given environment may comprise one of a testing environment and a production environment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

To meet various user requirements like generating executive summaries, dashboards and monitoring support, typical applications need to display data from multiple sources on a single page. Developing APIs that pull data from different systems (e.g., heterogeneous sources like other APIs, Windows Communication Foundation (WCF) Services, SQL Tables and Elasticsearch) and in different data formats (e.g., Extensible Markup Language (XML) and JavaScript Object Notation (JSON)) is essential for this purpose. However, this requires a full development cycle including requirement gathering, design, development, testing, deployment and support. Even after development, there is no guarantee that the solution is future-proof, as evolving business needs may require more complex APIs for data transformation, filtering, sorting, pagination, and aggregation from other sources. Meeting these evolving requirements can increase development efforts, costs, and time, and impact overall go-live velocity. To address these challenges and meet the demands of a fast-paced market, a solution that delivers required APIS faster, more reliably, and with high quality and standards while minimizing development, testing, and deployment efforts, costs and time is needed.

Illustrative embodiments provide technical solutions which allow clients to achieve more in less time, and with less effort and reduced cost through an APIaaS (API-as-a-Service) tool implementing a streamlined process that eliminates the need for deployment and release windows. The core framework of the APIaaS tool is rigorously tested and proven to perform well in various use cases, making it exceptionally reliable and allowing for faster processes that save time, effort and resources. APIs can be developed and tested for specific functions in a staging environment, and may be easily transitioned to a live or production environment (e.g., with a click of a button or other activation of user interface features of the APIaaS tool). Any issues can be identified and resolved promptly. Further, the APIaaS tool may implement a configuration-based approach that simplifies the user experience and eliminates the need for coding expertise. The technical solutions therefore allow clients to focus on achieving their goals without being bogged down by technical complexities.

Conventional approaches for developing custom APIs suffer from various technical problems. For example, conventional approaches do not provide any toolset for enabling self-service support for developers and other technical groups. Further, conventional approaches do not address the needs for: providing self-service APIs which minimize non-development activities for development and engineering team members; enabling developers, business architects and subject matter experts (SMEs) to iterate on requirements, build solution concepts and working Proof of Concepts (POCs) with minimum to no engineering involvement; ensuring quality teams have flexibility to simulate use cases and scenarios without having to develop and code; and empowering application teams to have self-service tools for their day-to-day activities. Conventional approaches, for example, may require the disclosure of sensitive connection and authentication details, leaving users vulnerable to potential security breaches. The technical solutions described herein provide an APIaaS tool that addresses these and other technical problems of conventional approaches by offering an affordable and secure solution packed with advanced features and capabilities.

Extract, Transform, Load (ETL) and reporting solutions may be used to connect to multiple data sources, but such solutions do not provide support for complex pipeline building and API exposure. The technical solutions described herein, in contrast, provide the APIaaS tool which is compatible with various heterogeneous data sources and provides various features which make it easy for users to orchestrate workflows and processes, both simple and complex, without requiring coding expertise. The technical solutions described herein are thus well-suited for organizations and other entities seeking a cost-effective, reliable solution for developing APIs to meet their unique needs. With its advanced features and capabilities, the APIaaS tool offers significant technical improvements.

Figure 3:
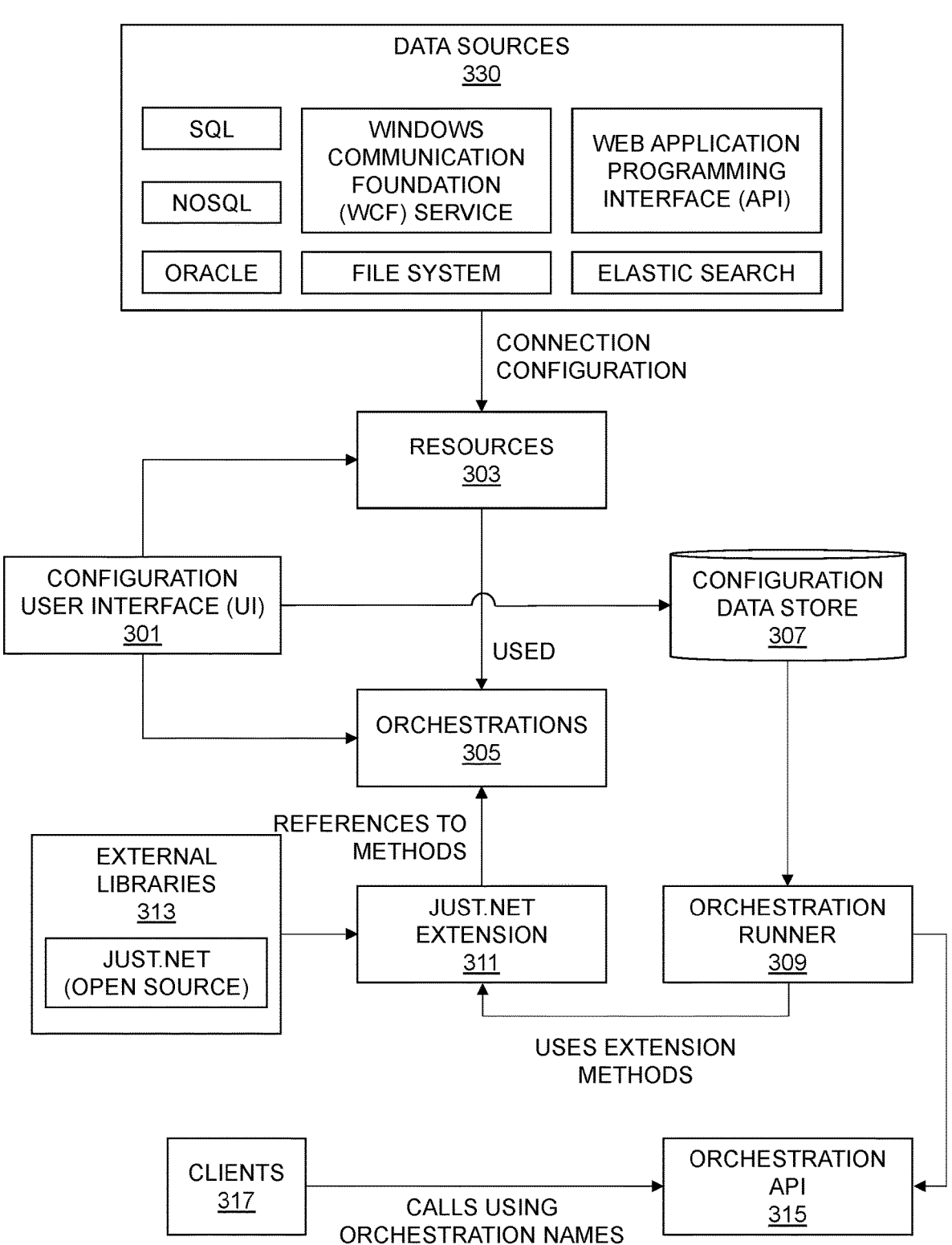
FIG. 3 shows a system implementing an application programming interface as a service tool in an illustrative embodiment.

FIG. 3 shows a system 300 implementing an APIaaS tool which includes a configuration user interface (UI) 301 for resource and orchestration management, an orchestration runner 309 for executing configurations, and an orchestration API 315 that accepts requests with a configuration name and returns a response. The configuration UI 301 may be used to configure resources 303 to connect to a set of data sources 330. The data sources 330 may include, but are not limited to, one or more SQL databases, one or more NoSQL database, one or more Oracle databases, one or more WCF services, one or more web APIs, one or more file systems, and one or more Elasticsearch data stores. The configuration UI 301 is also configured to set up orchestrations 305 and to maintain orchestration configurations in a configuration data store 307. Configuration changes may be in a draft state initially, and after testing the configuration changes can be published to go live. Once an orchestration configuration is in place, one or more clients 317 may call the orchestration API 315 utilizing an orchestration name of the orchestration configuration. The orchestration API 315 will then execute the pipeline of the orchestration configuration using the orchestration runner 309, and the orchestration API 315 will return one or more responses (if needed) back to the clients 317.

The orchestration runner 309 may utilize a JUST.net extension 311, which is built on one or more external libraries 313 including a JUST.net open source library. The JUST.net extension 311 is an extension of the JUST.net open source library, which adds additional functions to call different ones of the data sources 330 and also adds utility functions. While the JUST.net open source library supports the transformation of data from one schema to another, and from one format to another, it lacks the capability to call the resources 303 (e.g., including one or more of the data sources 330) and stitch them together. The JUST.net extension 311 not only allows for calling the resources 303, but also supports various heterogeneous data sources 330 (e.g., databases such as SQL, NoSQL, Mongo, Oracle, etc., web APIs, Restful services, WCF services, Elasticsearch, file systems, etc.). Additionally, the JUST.net extension 311 enables the orchestration runner 309 to have the capability to take the output from one API and build another request to call another API from that output, which is a novel approach. The API built in front of the JUST.net extension 311 to run the transformation using this framework is also novel. It should be appreciated that, in some embodiments, other solutions may be leveraged for transforming data from one schema to another, and for calling APIs which are independent and separate. The APIaaS tool supports both approaches in a cohesive manner, allowing for endless possibilities of building simple to complex APIs with no code (e.g., with no manual coding required).

The configuration UI 301 enables a user to configure the resources 303. The resource configurations contain details about how to connect to and call or query the different data sources 330.

For any relational (e.g., SQL) or NoSQL database, for example, the resources 303 may contain a connection string and a query to execute with parameters as a placeholder. These details will be used by the orchestration runner 309 to replace the parameters at run time, and connect and execute the SQL or other query with the correct parameter values. FIG. 4 shows pseudocode 400 of a resource for an SQL database, which includes a select query (e.g., "SELECT DISTINCT TOP 100 FROM ITEM_CATALOG i") with various parameters (e.g., "('{0}') {1} {2} {3} {4} {5} {6}") as well as a connection string (e.g., "ConnectionString").

For Web APIs, the resources 303 may contain an end point, method type, cookies, headers, authentication (if applicable) and request payload. All these elements can contain placeholders for parameters which can be replaced at run time by the orchestration runner 309. FIG. 5 shows pseudocode 500 of a resource for a Web API, which includes a resource name (e.g., the "key"), parameters to be replaced at run time (e.g., "{0}" and "{1}" in the "Request"), Web API connection details (e.g., "ConnectionDetails"), a token generation API (e.g., "APIAuthentication") configuration (if any, which can be parameterized), additional headers required by the Web API (e.g., "Headers") which can be parameterized, and additional cookies required by the Web API (e.g., "Cookies") which can be parameterized.

For WCF services, the resources 303 may contain an endpoint, method type, cookies, headers, authentication (if applicable) and request payload. All these elements can contain placeholders for parameters which can be replaced at run time by the orchestration runner 309. FIG. 6 shows pseudocode 600 of a resource for a WCF service, which includes a request and response type of XML, a Simple Object Access Protocol (SOAP) request (e.g., in the "Request"), and which supports multiple environment endpoints (e.g., the "ConnectionDetails").

For Elasticsearch data sources, the resources 303 may contain an endpoint, method type, cookies, headers, authentication (if applicable) and query template. All these elements can contain placeholders for parameters which can be replaced at run time by the orchestration runner 309. FIG. 7 shows pseudocode 700 of a resource for an Elasticsearch data source, which includes a resource name (e.g., the "Key"), parameters to be replaced at runtime (e.g., "{0}" and "{1}" in the "Request"), and which includes a parameter (e.g., "{2}") in the connection details (e.g., "ConnectionDetails").

For other types of data sources 330, resources 303 may be similarly configured with various elements, including elements with placeholders for parameters to be replaced at run time by the orchestration runner 309. The resources 303 may be maintained in a resource repository within the configuration data store 307. The configuration UI 301 may include a dashboard or other interface which permits users to manage the resources 303. The dashboard or other interface may include a list of the resources 303, such as the table 800 shown in FIG. 8 which shows names of resources and their associated resource types. The dashboard or other interface may also include a create/edit resource form, such as the form for the "Get_PAC_Offers_Resource" shown in 900-1 of FIG. 9A and 900-2 of FIG. 9B.

The orchestrations 305 allow users to define the steps in an API. The orchestrations 305 will have access to request objects coming through the orchestration API 315. A request object can be used to inject or replace parameter values in the resources 303 and other sections of a configuration. The orchestrations 305 may provide a dashboard or other interface (e.g., a scratch pad) where different steps can be chosen from a first pane (e.g., a left pane) and drag-and-dropped on the pad to build an entire pipeline for an orchestration. The steps may include Call Resource, Conditional Statement, For Loop, While Loop, and various other functions available in a function library of the orchestration runner 309 (e.g., which may be built on JUST.net in some embodiments). A list of default functions may be available at the orchestrations 305 dashboard or other interface. The output of the orchestrations 305 builder may be a configuration (e.g., a JSON configuration) expected by the orchestration runner 309. Various examples of the orchestrations 305 will now be described.

FIG. 10 shows pseudocode 1000 of an orchestration for a simple web API call and transforming the response from the web API call to a different schema and format. The orchestration includes an orchestration name (e.g., "Key"). Function calls in the pseudocode start with "#". For example, in "inputValue" the function call "#valueof($.id)" reads the value of the "Id" property coming in the request. A search value (e.g., "search Value") is calculated based on whether the "Id" parameter is empty or not. The orchestration of FIG. 10 includes an API call with a parameter named "resource", and a response is assigned to the "response" variable. The orchestration of FIG. 10 loops through the response and builds a custom response with required properties only (e.g., "#loop($.response.offerAttributes[0].values)").

FIG. 11 shows pseudocode 1100 of an orchestration for calling multiple resources and stitching responses together to build an aggregated response. The orchestration of FIG. 11 includes calls to multiple resources with responses assigned to different variables (e.g., "PremierProducts", "GetSettings", "GetCustomerSetDetail", "SNPCustomerSetDetails", "SKURuntimePricing", and "OCRuntimePrice"). The remainder of the orchestration of FIG. 11 (e.g., "PremierProductsResponse" through "OCRuntimePriceRequest") builds complex responses from the responses received from the multiple resources, with aggregation and augmentation.

The orchestrations 305 will be stored in an orchestration repository in the configuration data store 307. In some embodiments, the configuration UI 301 includes a dashboard or other interface for managing the orchestrations 305. The dashboard or other interface may include a list of orchestrations as shown in the table 1200 of FIG. 12 (e.g., showing orchestration names, version, the user that created the orchestration, the date of creation, the user that last modified the orchestration, the date of the last modification, the publish status, and the scheduled start and end date for the orchestration). The dashboard or other interface may also include an orchestration create/edit form 1300 as shown in FIG. 13, as well as a JSON editor 1400 as shown in FIG. 14 for managing the transformation.

The orchestration runner 309, in some embodiments, is built on top of the JUST.net open source library, which is extended with various capabilities to provide a JUST.net extension 311. Such capabilities to be added in the JUST.net extension 311 include: the capability to accept the orchestrations 305 and initial input, and to run the pipelines of the orchestrations 305; the capability to read resources 303 from the resource repository of the configuration data store 307; support for custom functions to call the resources 303 to support different data sources 330 (e.g., with and without authentication, using custom headers and pre-authentication token calls, cookies, etc.); the capability to accept the output of one of the resources 303 and to use that output to build a request for another one of the resources 303; the capability to execute multiple ones of the resources 303 sequentially and/or in parallel with synchronous and asynchronous support; the capability to support and enable custom components, including dynamic link libraries (DLLs) or custom logic plugins, and for calling methods of the custom components; the capability for offering debugging support including providing pipeline execution information for troubleshooting and testing; the capability to build hierarchical data structures from flat datasets; the capability for JSON minification and conversion support, as well as Cron expression evaluation support; the capability for JSON to Comma Separated Value (CSV) format conversion, and vice versa; the capability for tracking the pipeline and returning pipeline information with exception and error messages; and the capability for returning a final output as configured in the orchestrations 305 after completing the orchestration pipelines.

The orchestration API 315, in some embodiments, is built on a .NET core framework which accepts an orchestration name and other parameters like use caching, whether pipeline information is required or not, data state (e.g., draft, approved, etc.) to use, etc., and accepts a request if required by the orchestration. The orchestration API 315 will retrieve an orchestration corresponding to the orchestration name from the orchestration repository in the configuration data store 307, and passes the orchestration configuration, other parameters and the initial request to the orchestration runner 309. After the orchestration runner 309 returns a response, the orchestration API 315 returns the response back to the requesting one of the clients 317.

FIG. 15 shows examples of pseudocode for calling the orchestration API 315. Pseudocode 1500 shows an example of an API call to an orchestration which does not need any request parameters. In the pseudocode 1500, "GetAllCategories" is the orchestration name, "SIT" is the environment to use for resources called in the orchestration, and the internal parameters specify whether to use a cache or not (e.g., forceCacheRefresh=true") and whether pipeline debugging information is expected in the response or not (e.g., "includepipeline-true"). Pseudocode 1505 shows an example of an API call to an orchestration which accepts parameters as query strings. In the pseudocode 1505, "GetCategoryByID" is the orchestration name, "SIT" (Systems Integration Testing) is the environment to use for resources called in the orchestration, the internal parameters specify whether to use a cache or not (e.g., forceCacheRefresh=true"), whether pipeline debugging information is expected in the response or not (e.g., "includepipeline-true"), and specifies a parameter (e.g., "id-4099") used in the orchestration. Pseudocode 1510 shows an example of an API call to an orchestration which accepts parameters as a request body. In the pseudocode 1510, "GenerateCategoryTree" is the orchestration name, "SIT" is the environment to use for resources called in the orchestration, the internal parameters specify whether to use a cache or not (e.g., forceCacheRefresh=true") and whether pipeline debugging information is expected in the response or not (e.g., "includepipeline-true"), and the request body includes "{"ProductType": "winsnp", "Country": "us", "Segment": "dhs", "Language": "en"}".

Once a given orchestration is defined and saved, it may be called by the orchestration API 315 using Postman or any test tool. FIGS. 16 and 17 show examples of pseudocode 1600 and 1700 of results of calling the "GenerateCategoryTree" orchestration.

The technical solutions described herein advantageously provide the APIaaS tool, which enables the creation of orchestrations allowing users to effortlessly build new APIs without the requirement to write any code or go through deployment processes. The APIaaS tool also allows generation of serverless APIs, streamlining the entire API development workflow. The APIaaS tool provides the capability for presenting data from diverse sources as APIs, effectively transforming data into accessible and consumable services. This approach goes beyond traditional data handling, offering a novel and efficient way to interact with data in the form of APIs. The APIaaS tool also offers exceptional capabilities during the orchestration or pipeline building process, with such capabilities encompassing calling various APIs, connecting disparate data sources, and effectively stitching and aggregating responses from multiple origins. Additionally, the inclusion of logical constructs such as loops, conditions and custom functions provides novel aspects. By offering a comprehensive set of features, the APIaaS tool is able to revolutionize the way orchestrations and pipelines are created and managed. The seamless integration of diverse functionalities in a single platform provides various technical advantages relative to conventional approaches, and opens new possibilities for efficient and flexible data handling and processing.

Conventional approaches may utilize RESTful APIs, GraphQL, OData Services or other frameworks and products to create APIs. When it comes to complex business logic or connecting to heterogeneous data sources, such conventional approaches require coding and a full development lifecycle. Further, such conventional approaches do not offer the flexibility of creating APIs on-the-fly, and do not provide "no code" deployment solutions.

Open-source data automation tools may be used to connect to multiple data sources, which makes the process of ETL pipeline setup less complicated and quicker, and can provide real-time data synchronization capabilities. Further, open-source data integration tools may be deployed as standalone applications in web containers, connecting complex workflows easily and quickly transforming Java Enterprise Edition (JEE), Open Service Gateway Initiative (OSGi) and Spring container. Tools may also be used to connect multiple data sources with just a few steps, and for passing data through an API using the APIaaS tool described herein. A drag-and-drop UI may be used to make the connection of multiple data sources easier, and allows for connecting multiple data sources (e.g., Amazon Web Services (AWS), MySQL, MongoDB, etc.). The credentials stored in the APIaaS tool are first encrypted before storage to provide a secure solution. The APIaaS tool may act as a proxy layer, so it does not store any data from the data sources and instead acts as a pass-through entity.

Various solutions and tools may be used to build reports from various data sources, and allow for loading, transforming and storing data. The APIaaS tool described herein allows a way to publish an API which can be used by clients to render, see and perform other actions on the transformed data without storing or transferring it from another data source. Some conventional approaches may act as proxies for reading data from multiple data sources and sending it to another API or data source, but lack the ability to create and configure APIs which can be leveraged for various use cases. Further, conventional approaches lack the various capabilities and features of the APIaaS tool described herein, and require manual coding for implementing APIs.

Various example implementations will now be described. Consider, as an example, a search content UI. An organization or other entity may operate a website or other service which provides global search capabilities for products, documents, knowledge base articles, support content, etc. Such content and documents may be stored in various data sources, such as an Elasticsearch data store. To see this content in row format, for several reasons, requires knowledge of entire environments, endpoints and expertise in Elasticsearch query and its usage. Using the APIaaS tool described herein, the entire visibility, dashboards, filtering capabilities and various operational solutions are provided and automated by connecting Elasticsearch queries to another tool which has the capability to create visualizations. Using the APIaaS tool described herein, this integration is seamless and quick. Since the schema and interfaces of both the systems are different, there is a need for an adaptor in between the systems. The APIaaS tool described herein allows for building the adaptor with zero manual coding. The orchestration in this use case enables transformation of data from a format expected by another tool to the Elasticsearch format, and vice versa. The orchestration in this use case further enables visibility tools for filtering, sorting and searching requests to Elasticsearch query so that when an end-user queries or searches anything from the tool the result is a relevant response. This is all exposed as an API, which is a completely alien tool that is able to integrate with the systems and it is done with no code and no new deployment. FIG. 18 shows a system 1800 showing how components of an APIaaS tool implement the orchestration for this use case. Here, the orchestration API 315 leverages the orchestration runner 309, resources 303 and orchestrations 305 as described above with respect to the system 300 of FIG. 3. Here, the orchestration API 315 bridges the two disparate systems of a search tool 1801 (e.g., implementing Elasticsearch) and a visibility tool 1807. The search tool 1801 itself access a search API 1803 for searching a data source (e.g., a website) 1805 with the relevant information (e.g., for products, documents, knowledge base articles, support content, etc. associated with an organization or other entity operating the data source 1805). In the system 1800, the APIaaS tool provides, through the orchestration API 315 bridging the search tool 1801 and the visibility tool 1807, search, filtering and sorting capabilities to thousands of indexes, and allows for hundreds of users to make tens of thousands of requests to the orchestration API 315 daily. The APIaaS tool in the system 1800 further reduces troubleshooting time (e.g., from 10 or more hours down to a few minutes) and enables an entire team to respond to incidents and production issues. Further, use of the APIaaS tool in the system 1800 can allow for retiring legacy tools which are used for searching in various administration and operational use cases like boosting certain products, configuration for enabling and disabling search features, updating the index data, etc. Further, the use of the APIaaS tool in the system 1800 enables artificial intelligence (AI)/machine learning (ML) based search relevancy.

Figure 19:
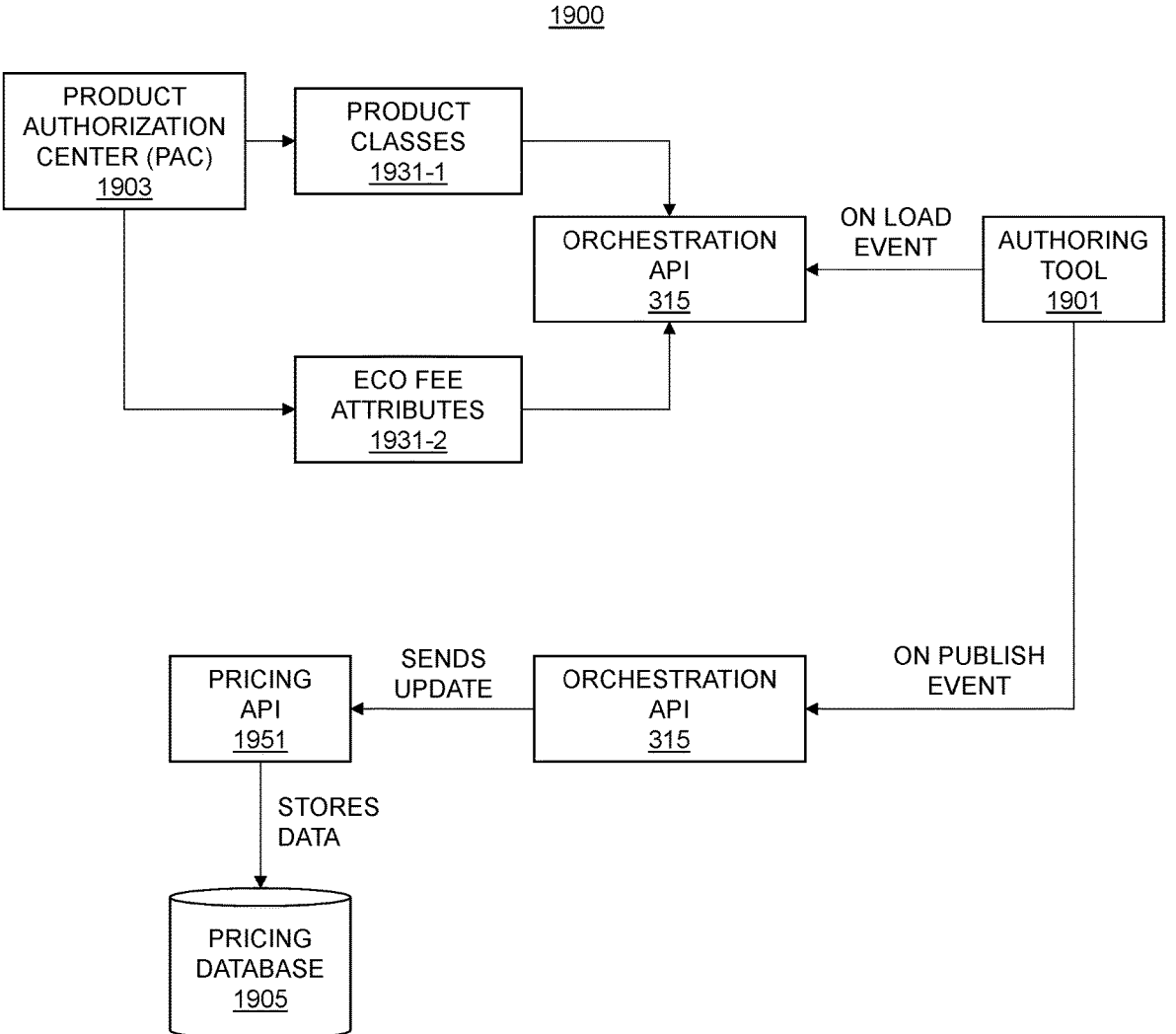
FIG. 19 shows a system implementing an orchestration for fee publishing using an application programming interface as a service tool in an illustrative embodiment.

Consider, as another example, an "eco fee" publishing tool. Eco fees may be used to fund recycling programs for electronic products. An organization or other entity may be legally bound to charge eco fees on its sales, and the calculation of eco fees may be different and complex in different countries and regions based on applicable laws. FIG. 19 shows a system 1900 which leverages the APIaaS tool described herein to provide eco fee publishing functionality. Eco fee rules may be authored in the authoring tool 1901 in the system 1900 of FIG. 19, which may need information from multiple different data sources including a Product Authorization Center (PAC) 1903. The authoring tool 1901, for example, may need product classes 1931-1 and eco fee attributes 1931-2 from the PAC 1903. The orchestration API 315 of the APIaaS tool may be used, on load events, to integrate the authoring tool 1901 with the PAC 1903, and for synchronizing the required entities (e.g., the product classes 1931-1 and the eco fee attributes 1931-2) to the authoring tool 1901. The APIaaS tool advantageously allows this integration with zero manual coding and deployment, where the orchestration API 315 acts a bridge between the authoring tool 1901 and the PAC 1903, and which exposes the information from the PAC 1903 (e.g., the product classes 1931-1 and the eco fee attributes 1931-2) in a response to the authoring tool 1901 in a format that the authoring tool 1901 expects (e.g., which is assumed to be different than the format used by the PAC 1903). Once the eco fee results are built, those rules are sent from the authoring tool 1901 to another system, the pricing database 1905. To do so, the orchestration API 315 is used, on a publish event from the authoring tool 1901, to send updates to a pricing API 1951 associated with the pricing database 1905, which stores the data in the pricing database 1905. The orchestration API 315 advantageously allows eco fee rules, once built at the authoring tool 1901, to be sent to the pricing database 1905 via the pricing API 1951 to calculate eco fees at runtime. The orchestration API 315 can advantageously integrate conversion functionality for converting between a schema used by the authoring tool 1901 into a request that is understandable by the pricing API 1951. This integration provided by the orchestration API 315 provides real-time synchronization between the authoring tool 1901 and the pricing database 1905. Advantageously, the APIaaS tool in this use case enables real-time product classes 1931-1 and eco fee attributes 1931-2 data availability for rule authoring in the authoring tool 1901, and requires zero footprint for synchronizing data between multiple systems (e.g., the authoring tool 1901, the PAC 1903 and the pricing database 1905). In the system 1900, the APIaaS tool allows multiple users to author rules, with automated actions calling the orchestration API 315 (e.g., with thousands of calls daily). Advantageously, zero manual coding and no deployment integration are required, as the APIaaS tool in the system 1900 leverages existing APIs provided by the authoring tool 1901, the PAC 1903 and the pricing database 1905.

Figure 20:
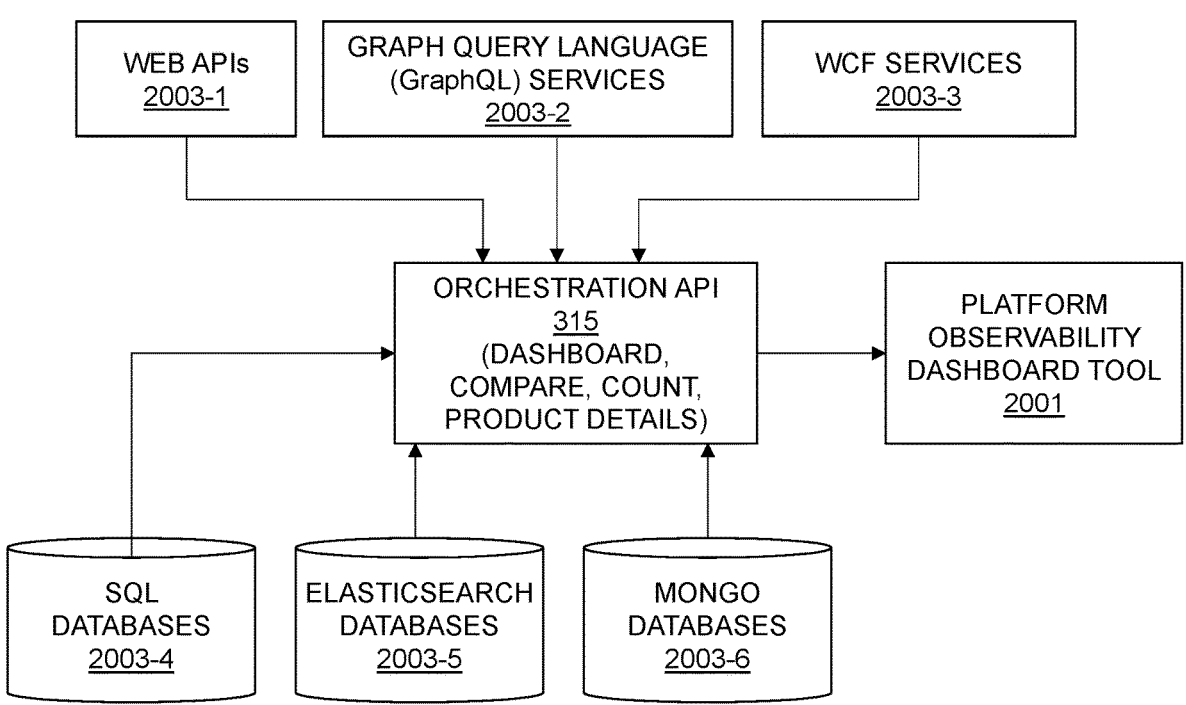
FIG. 20 shows a system implementing orchestrations for platform observability dashboards using an application programming interface as a service tool in an illustrative embodiment.

Consider, as another example, a platform observability dashboard tool. As part of platform observability for an organization or other entity, various dashboards are used for engineers, support, leadership and other stakeholders to monitor the current state of systems and when there are issues and/or incidents. To enable end-to-end observability, lots of integration and aggregation are required to see how various products exist in a source system and all the intermediate systems until a destination system, as well as the state of the products in all the systems, pricing, and other product information state in order to enable highlighting issues when there are mismatches or inconsistencies between the systems, etc. FIG. 20 shows a system 2000 in which the APIaaS tool is leveraged by platform observability dashboard tool 2001 to provide such functionality without any manual coding and deployment. The orchestration API 315 is used by the platform observability dashboard tool 2001 to pull information from various data sources, including one or more web APIs 2003-1, one or more GraphQL services 2003-3, one or more WCF services 2003-3, one or more SQL databases 2003-4, one or more Elasticsearch databases 2003-5, and one or more MongoDB databases 2003-6 (collectively, data sources 2003). The platform observability dashboard tool 2001 development is done to render the responses of the orchestration API 315 (e.g., dashboard, compare, count, product details, etc.) from the data sources 2003, quickly solving the most complex problem of integrating data from the multiple data sources 2003 with minimal manual effort. In the system 2000, the APIaaS tool enables integration of data from heterogeneous data sources 2003 in a single orchestration to the platform observability dashboard tool 2001, providing end-to-end visibility of all the systems involved. The orchestration API 315 in the system 2000 may be used heavily, as engineers, support team members, business users and leadership teams may constantly utilize and refresh the platform observability dashboard tool 3001 during peak hours (e.g., with tens of thousands of requests per hour).

It should be appreciated that FIGS. 18-20 show just three non-limiting example use cases where the APIaaS tool described herein may be leveraged. The APIaaS tool may be used in numerous other use cases, including Modern Corporate Capabilities (MCC) observability among multiple disparate systems to build end-to-end Unified Product Details (UPD) flows involving multiple legacy and north star systems, in smart pricing utilities configured to provide different reporting and visibility functionality, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated generation and execution of API calls will now be described in greater detail with reference to FIGS. 21 and 22. Although described in the context of system 100, these platforms may also be used to implement at least portions of other information processing systems in other embodiments.

Figure 21:
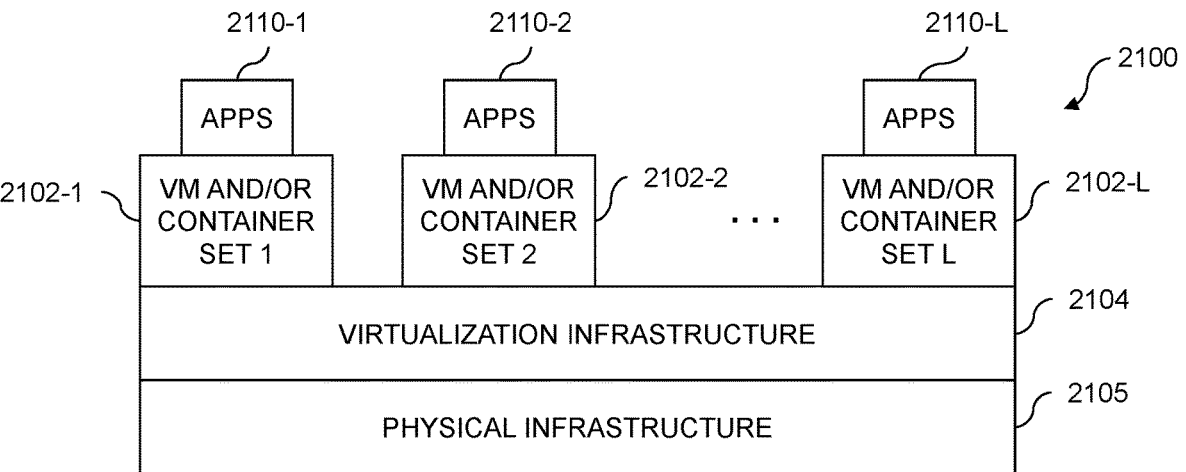
FIGS. 21 and 22 show examples of processing platforms that may be utilized to implement at least a portion of an information processing system in illustrative embodiments.
Figure 22:
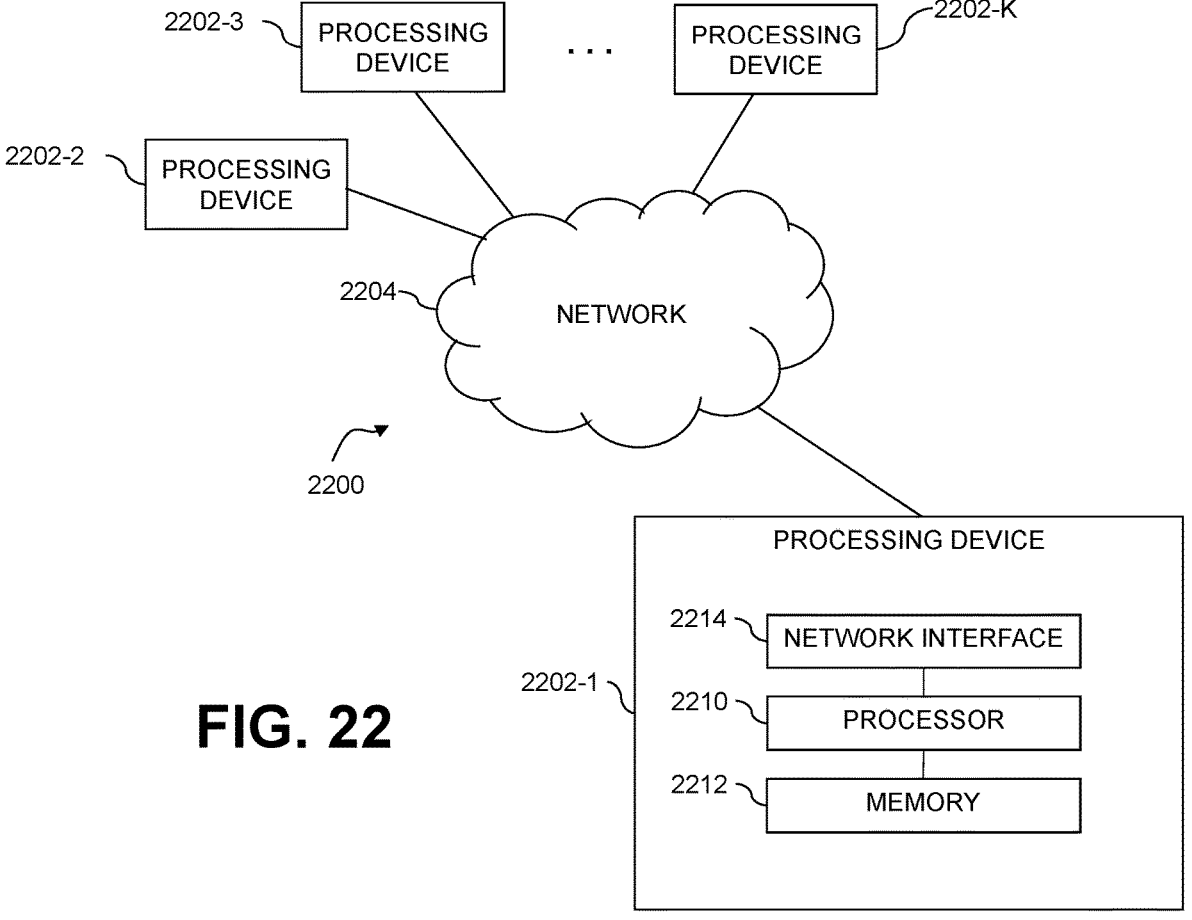

FIG. 21 shows an example processing platform comprising cloud infrastructure 2100. The cloud infrastructure 2100 comprises a combination of physical and virtual processing resources that may be utilized to implement at least a portion of the information processing system 100 in FIG. 1. The cloud infrastructure 2100 comprises multiple virtual machines (VMs) and/or container sets 2102-1, 2102-2, . . . 2102-L implemented using virtualization infrastructure 2104. The virtualization infrastructure 2104 runs on physical infrastructure 2105, and illustratively comprises one or more hypervisors and/or operating system level virtualization infrastructure. The operating system level virtualization infrastructure illustratively comprises kernel control groups of a Linux operating system or other type of operating system.

The cloud infrastructure 2100 further comprises sets of applications 2110-1, 2110-2, . . . 2110-L running on respective ones of the VMs/container sets 2102-1, 2102-2, . . . 2102-L under the control of the virtualization infrastructure 2104. The VMs/container sets 2102 may comprise respective VMs, respective sets of one or more containers, or respective sets of one or more containers running in VMs.

In some implementations of the FIG. 21 embodiment, the VMs/container sets 2102 comprise respective VMs implemented using virtualization infrastructure 2104 that comprises at least one hypervisor. A hypervisor platform may be used to implement a hypervisor within the virtualization infrastructure 2104, where the hypervisor platform has an associated virtual infrastructure management system. The underlying physical machines may comprise one or more distributed processing platforms that include one or more storage systems.

In other implementations of the FIG. 21 embodiment, the VMs/container sets 2102 comprise respective containers implemented using virtualization infrastructure 2104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2100 shown in FIG. 21 may represent at least a portion of one processing platform. Another example of such a processing platform is processing platform 2200 shown in FIG. 22.

The processing platform 2200 in this embodiment comprises a portion of system 100 and includes a plurality of processing devices, denoted 2202-1, 2202-2, 2202-3, . . . 2202-K, which communicate with one another over a network 2204.

The network 2204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2202-1 in the processing platform 2200 comprises a processor 2210 coupled to a memory 2212.

The processor 2210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2212 may comprise random access memory (RAM), read-only memory (ROM), flash memory or other types of memory, in any combination. The memory 2212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2202-1 is network interface circuitry 2214, which is used to interface the processing device with the network 2204 and other system components, and may comprise conventional transceivers.

The other processing devices 2202 of the processing platform 2200 are assumed to be configured in a manner similar to that shown for processing device 2202-1 in the figure.

Again, the particular processing platform 2200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated generation and execution of API calls as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to receive a request to execute one or more orchestrations, a given one of the one or more orchestrations defining a sequence of two or more actions, a given one of the two or more actions utilizing one or more resource configurations associated with one or more data sources, a given one of the one or more resource configurations associated with a given one of the one or more data sources comprising connection information specifying how to connect to a data source type of the given data source, wherein one or more placeholders associated with the connection information are replaced with parameters specific to the given data source, in conjunction with execution of the given action of the given orchestration, in order to access the given data source;

to identify one or more request objects in the received request, a given one of the one or more request objects defining one or more parameter values to be used in place of the one or more placeholders in the one or more resource configurations associated with the given action of the given orchestration;

to generate an application programming interface call configured to perform the given action in the sequence of two or more actions defined in the given orchestration utilizing the one or more parameter values defined in the given request object; and to execute the generated application programming interface call to generate one or more response objects.

2. The apparatus of claim 1 wherein the sequence of two or more actions defined in the given orchestration comprises (i) obtaining a response object in a first format from the given data source and (ii) transforming the response object from the first format to a second format.

3. The apparatus of claim 2 wherein the given data source is associated with a first entity, wherein the second format is associated with a second entity, and wherein the sequence of two or more actions defined in the given orchestration further comprises (iii) providing the transformed response object to another one of the one or more data sources associated with a second entity different than the first entity.

4. The apparatus of claim 2 wherein the given data source is associated with a first entity, wherein the second format is associated with a second entity, and wherein the sequence of two or more actions defined in the given orchestration further comprises (iii) utilizing at least a portion the transformed response object as a request object provided to another one of the one or more data sources associated with a second entity different than the first entity.

5. The apparatus of claim 1 wherein the sequence of two or more actions defined in the given orchestration comprises (i) obtaining a first response object from a first one of the one or more data sources, (ii) obtaining a second response object from a second one of the one or more data sources, and (iii) generating an aggregated response object based at least in part on the first response object and the second response object.

6. The apparatus of claim 5 wherein the first response object is in a first format and the second response object is in a second format, the second format being different than the first format.

7. The apparatus of claim 5 wherein the first data source is associated with a first entity and the second data source is associated with a second entity, the second entity being different than the first entity.

8. The apparatus of claim 1 wherein the given resource configuration associated with the given data source further comprises authentication information for accessing the given data source.

9. The apparatus of claim 1 wherein at least one of the one or more data sources comprises one of an application programming interface and a database.

10. The apparatus of claim 1 wherein the at least one processing device is further configured to provide, to a client device associated with the received request, the generated one or more response objects.

11. The apparatus of claim 1 wherein the given request object specifies that error tracking is to be utilized during execution of the given orchestration, and wherein at least one of the generated one or more response objects comprises error tracking information associated with the execution of the generated application programming interface call.

12. The apparatus of claim 1 wherein the given request object specifies a given environment to be utilized during execution of the given orchestration, and wherein the generated application programming interface call is executed in the given environment.

13. The apparatus of claim 12 wherein the given environment comprises one of a testing environment and a production environment.

14. A computer program product comprising a non-transitory processor-readable storage medium having stored therein program code of one or more software programs, wherein the program code when executed by at least one processing device causes the at least one processing device:

to receive a request to execute one or more orchestrations, a given one of the one or more orchestrations defining a sequence of two or more actions, a given one of the two or more actions utilizing one or more resource configurations associated with one or more data sources, a given one of the one or more resource configurations associated with a given one of the one or more data sources comprising connection information specifying how to connect to a data source type of the given data source, wherein one or more placeholders associated with the connection information are replaced with parameters specific to the given data source, in conjunction with execution of the given action of the given orchestration, in order to access the given data source;

to identify one or more request objects in the received request, a given one of the one or more request objects defining one or more parameter values to be used in place of the one or more placeholders in the one or more resource configurations associated with the given action of the given orchestration;

to generate an application programming interface call configured to perform the given action in the sequence of two or more actions defined in the given orchestration utilizing the one or more parameter values defined in the given request object; and to execute the generated application programming interface call to generate one or more response objects.

15. The computer program product of claim 14 wherein the sequence of two or more actions defined in the given orchestration comprises (i) obtaining a response object in a first format from the given data source and (ii) transforming the response object from the first format to a second format.

16. The computer program product of claim 14 wherein the sequence of two or more actions defined in the given orchestration comprises (i) obtaining a first response object from a first one of the one or more data sources, (ii) obtaining a second response object from a second one of the one or more data sources, and (iii) generating an aggregated response object based at least in part on the first response object and the second response object.

17. A method comprising:

receiving a request to execute one or more orchestrations, a given one of the one or more orchestrations defining a sequence of two or more actions, a given one of the two or more actions utilizing one or more resource configurations associated with one or more data sources, a given one of the one or more resource configurations associated with a given one of the one or more data sources comprising connection information specifying how to connect to a data source type of the given data source, wherein one or more placeholders associated with the connection information are replaced with parameters specific to the given data source, in conjunction with execution of the given action of the given orchestration, in order to access the given data source;

identifying one or more request objects in the received request, a given one of the one or more request objects defining one or more parameter values to be used in place of the one or more placeholders in the one or more resource configurations associated with the given action of the given orchestration;

generating an application programming interface call configured to perform the given action in the sequence of two or more actions defined in the given orchestration utilizing the one or more parameter values defined in the given request object; and executing the generated application programming interface call to generate one or more response objects;

wherein the method is performed by at least one processing device comprising a processor coupled to a memory.

18. The method of claim 17 wherein the sequence of two or more actions defined in the given orchestration comprises (i) obtaining a response object in a first format from the given data source and (ii) transforming the response object from the first format to a second format.

19. The method of claim 17 wherein the sequence of two or more actions defined in the given orchestration comprises (i) obtaining a first response object from a first one of the one or more data sources, (ii) obtaining a second response object from a second one of the one or more data sources, and (iii) generating an aggregated response object based at least in part on the first response object and the second response object.

20. The method of claim 17 wherein the given resource configuration associated with the given data source further comprises authentication information for accessing the given data source.

* * * * *